(12) United States Patent
Ohwatari et al.

(10) Patent No.: US 9,814,054 B2
(45) Date of Patent: *Nov. 7, 2017

(54) BASE STATION, USER APPARATUS AND INTERFERENCE REDUCTION METHOD

(71) Applicant: NTT DOCOMO, INC., Tokyo (JP)

(72) Inventors: Yusuke Ohwatari, Tokyo (JP); Kazuaki Takeda, Tokyo (JP); Satoshi Nagata, Tokyo (JP); Yousuke Sano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/905,002

(22) PCT Filed: Jun. 16, 2014

(86) PCT No.: PCT/JP2014/065872
§ 371 (c)(1),
(2) Date: Jan. 14, 2016

(87) PCT Pub. No.: WO2015/008568
PCT Pub. Date: Jan. 22, 2015

(65) Prior Publication Data
US 2016/0165616 A1    Jun. 9, 2016

(30) Foreign Application Priority Data
Jul. 19, 2013  (JP) .................................. 2013-150732

(51) Int. Cl.
*H04W 72/08*    (2009.01)
*H04L 5/00*     (2006.01)
(Continued)

(52) U.S. Cl.
CPC ......... *H04W 72/082* (2013.01); *H04L 5/0032* (2013.01); *H04L 5/0051* (2013.01);
(Continued)

(58) Field of Classification Search
CPC . H04W 72/082; H04W 72/042; H04J 11/005; H04L 5/0053; H04L 5/0073
See application file for complete search history.

(56) References Cited

U.S. PATENT DOCUMENTS

2011/0312355 A1* 12/2011 Cheng ................... G01S 5/0215
455/501
2012/0099544 A1*  4/2012 Pajukoski ............. H04L 5/0032
370/329
(Continued)

FOREIGN PATENT DOCUMENTS

| JP | 2010-178237 A | 8/2010 |
| JP | 2014-150387 A | 8/2014 |
| JP | 2014-195200 A | 10/2014 |

OTHER PUBLICATIONS

International Search Report issued in corresponding application No. PCT/JP2014/065872 dated Jul. 22, 2014 (4 pages).
Written Opinion issued in corresponding application No. PCT/JP2014/065872 dated Jul. 22, 2014 (5 pages).
Peter Hoeher, et al., "Two-Dimensional Pilot-Symbol-Aided Channel Estimation by Wiener Filtering"; IEEE Proc. ICASSP 97; pp. 1845-1848; 1997 (4 pages).
(Continued)

*Primary Examiner* — Jung Park
(74) *Attorney, Agent, or Firm* — Osha Liang LLP

(57) ABSTRACT

A base station connected to a user apparatus in a radio communication system is provided. The base station includes a receiving unit configured to receive from an interference base station first control information which is used by the user apparatus for reducing an uplink interference signal from one or more cells formed by the interference base station or from another user apparatus, a generation unit configured to generate second control information based on one or more pieces of the first control information received from the interference base station, and a transmitting unit configured to transmit the second control information to the user apparatus by a downlink control signal.

12 Claims, 25 Drawing Sheets

(51) Int. Cl.
*H04W 72/04* (2009.01)
*H04W 92/20* (2009.01)

(52) U.S. Cl.
CPC ......... *H04L 5/0073* (2013.01); *H04W 72/042* (2013.01); *H04W 92/20* (2013.01)

(56) References Cited

U.S. PATENT DOCUMENTS

| | | | | |
|---|---|---|---|---|
| 2013/0039307 | A1* | 2/2013 | Han | H04L 1/1861 370/329 |
| 2013/0121266 | A1* | 5/2013 | Ko | H04J 13/0074 370/329 |
| 2013/0279361 | A1* | 10/2013 | Seo | H04J 11/0053 370/252 |

OTHER PUBLICATIONS

Bo Yu, et al,; "Dynamic TDD support in the LTE-B enhanced Local Area architecture"; The 4th IEEE International Workshop; pp. 585-591; 2012 (7 pages).
Mohammed Al-Rawi, et al.; "A Dynamic TDD Inter-Cell Interference Coordination scheme for Long Term Evolution Networks"; IEEE 22nd International Symposium; pp. 1590-1594; 2011 (5 pages).
Lei Lei et al.; "Operator Controlled Device-To-Device Communications in LTE-Advanced Networks"; IEEE Wireless pp. 96-104; Jun. 2012 (9 pages).
Office Action issued in the counterpart Japanese Patent Application No. 2013-150732, dated Sep. 12, 2017 (6 pages).

* cited by examiner

FIG.2

$$W_{\text{IRC}} = \frac{P_{00}}{N_{\text{Stream},00}} \hat{G}_{00}^H(k,l) \underbrace{\left( \sum_{i=0}^{N_{\text{cell}}-1} \sum_{j=0}^{N_{\text{user}}-1} \frac{P_{ij}}{N_{\text{Stream},ij}} \hat{G}_{ij}(k,l) \hat{G}_{ij}^H(k,l) + \sigma_N^2 I \right)^{-1}}_{\text{COVARIANCE MATRIX INCLUDING CHANNEL MATRICES OF INTERFERENCE CELLs}}$$

| | |
|---|---|
| $G_{ij}$ | : CHANNEL MATRIX AFTER MULTIPLICATION OF TRANSMIT WEIGHT MATRIX OF $j^{TH}$ UE ON THE SAME RESOURCE IN $i^{TH}$ CELL (NUMBER OF RECEIVE ANTENNAS * NUMBER OF TRANSMIT STREAMS) |
| $\hat{G}_{ij}$ | : ESTIMATED VALUE OF THE CHANNEL MATRIX BASED ON REFERENCE SIGNAL |
| $P_{ij}$ | : TRANSMIT POWER OF $j^{TH}$ UE IN $i^{TH}$ CELL |
| $N_{\text{Stream},ij}$ | : NUMBER OF TRANSMIT STREAMS OF $j^{TH}$ UE IN $i^{TH}$ CELL |
| $\sigma_N^2$ | : NOISE POWER |
| $k$ | : SUB-CARRIER INDEX |
| $l$ | : OFDM SYMBOL INDEX |

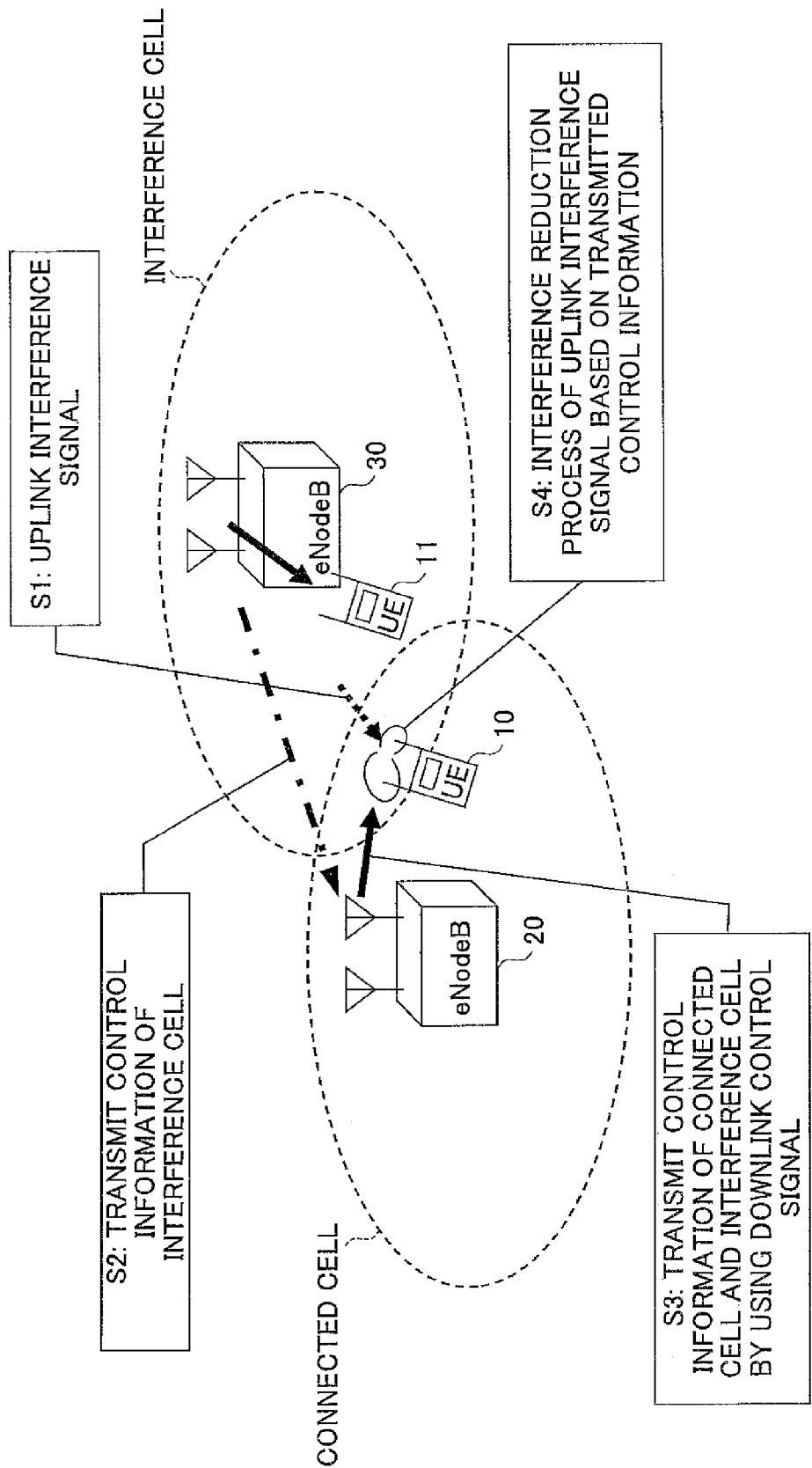

FIG.7

| TARGET CHANNEL/SIGNAL OF INTERFERENCE REDUCTION PROCESS | |
|---|---|
| PHYSICAL UPLINK SHARED CHANNEL (PUSCH) | PUSCH DEMODULATION REFERENCE SIGNAL (DMRS) |
| | PUSCH |

| REFERENCE SIGNAL FOR CHANNEL QUALITY MEASUREMENT (SRS) |
|---|

FIG.8

| TARGET CHANNEL/SIGNAL OF INTERFERENCE REDUCTION PROCESS | | INTERFERENCE REDUCTION PROCESS METHOD |
|---|---|---|
| PHYSICAL UPLINK SHARED CHANNEL (PUSCH) | PUSCH DEMODULATION REFERENCE SIGNAL (DMRS) | PERFORM CHANNEL ESTIMATION BASED ON DMRS, AND CANCEL INTERFERENCE SIGNAL (DMRS) BY USING DMRS SEQUENCE |
| | PUSCH | SUPPRESS (IRC RECEPTION) OR CANCEL (SIC) INTERFERENCE SIGNAL (PUSCH) BY USING RESULT OF CHANNEL ESTIMATION BASED ON DMRS |

FIG.9

| CONTROL INFORMATION TYPE | SIGNAL TYPE | TRANSMISSION TARGET | INFORMATION ELEMENT | CONTENTS |
|---|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | groupHoppingEnabled | SIGNALING TO TURN IT ON TO CHANGE AMONG 30 DIFFERENT KINDS OF SEQUENCES IN TERMS OF TIME BASED ON SLOT NUMBER, CELL ID (OR VIRTUAL CELL ID) AND SEQUENCE SHIFT PATTERN |
| | | | sequenceHoppingEnabled | SIGNALING TO TURN IT ON TO CHANGE BETWEEN TWO GROUPS, EACH OF WHICH INCLUDES 30 DIFFERENT KINDS OF SEQUENCES, IN TERMS OF TIME BASED ON SLOT NUMBER, CELL ID (OR VIRTUAL CELL ID) AND SEQUENCE SHIFT PATTERN |
| | | | groupAssignmentPUSCH | PARAMETER OF THE ABOVE HOPPING, INCLUDING POSITIVE VALUES 0 THROUGH 29 |
| | | | cyclicShift | PARAMETER FOR DETERMINING PHASE ROTATION AMOUNT AND INTER-TRANSMIT-LAYER MULTIPLEXING CODE OF SEQUENCE, DEFINED BY 8 KINDS OF VALUES |
| | | TRANSMIT INDIVIDUAL PARAMETER TO UE | groupHoppingDisabled | SIGNALING TO FORCEFULLY TURN OFF SEQUENCE-HOPPING |
| | | | nPUSCH-Identity, nDMRS-CSH-Identity | ID AVAILABLE TO BE SET FOR INDIVIDUAL UE IN PLACE OF CELL ID |
| DYNAMIC CONTROL INFORMATION | DCI | TRANSMIT INDIVIDUAL PARAMETER TO UE | CYCLIC SHIFT AMOUNT | PARAMETER FOR DETERMINING PHASE ROTATION AMOUNT, DEFINED BY 8 KINDS OF VALUES (DIFFERENT FROM SHIFT AMOUNT TRANSMITTED BY RRC SIGNALING) |
| | | | SLOT NUMBER | |
| | | | USER ALLOCATION INFORMATION | |

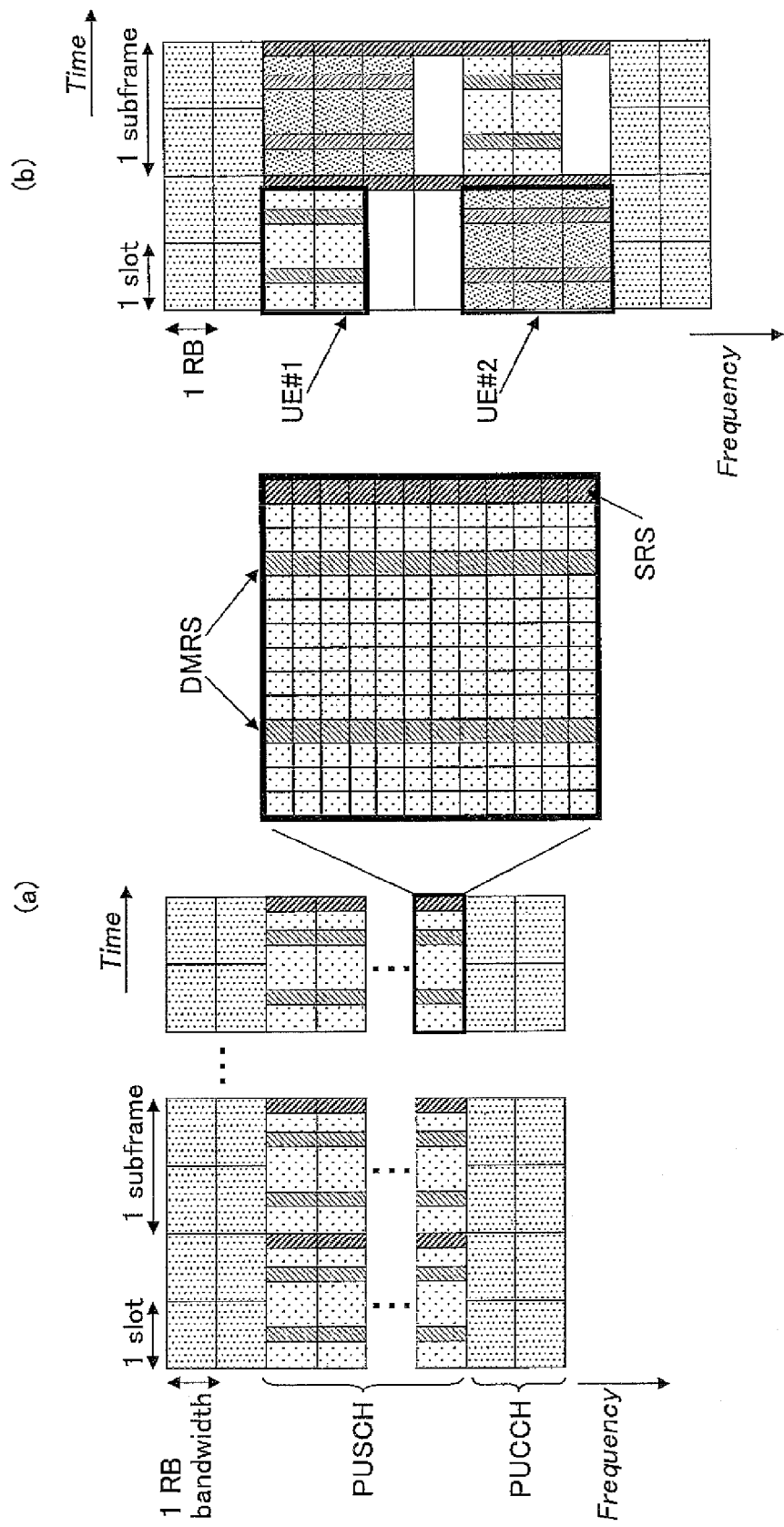

FIG.11

| CONTROL INFORMATION TYPE | SIGNAL TYPE | TRANSMISSION TARGET | INFORMATION ELEMENT |
|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | CELL ID OF INTERFERENCE CELL |
| | | | groupHoppingEnabled |
| | | | sequenceHoppingEnabled |
| | | | groupAssignmentPUSCH |
| | | | cyclicShift |
| | | TRANSMIT INDIVIDUAL PARAMETER TO UE | (groupHoppingDisabled + INTERFERENCE USER ID) * NUMBER OF INTERFERENCE USERS |
| | | | (nPUSCH-Identity, nDMRS-CSH-Identity + INTERFERENCE USER ID) * NUMBER OF INTERFERENCE USERS |
| DYNAMIC CONTROL INFORMATION | DCI | INFORMATION ELEMENT | (CYCLIC SHIFT AMOUNT + INTERFERENCE USER ID) * NUMBER OF INTERFERENCE USERS |
| | | | SLOT NUMBER OF INTERFERENCE CELL (NOT NECESSARY IN CASE OF COMPLETE SYNCHRONIZATION) |
| | | | INTERFERENCE USER ALLOCATION INFORMATION (TRANSMIT INFORMATION RELATED TO DESIRED SIGNAL ALLOCATION PORTION ONLY) EX: TRANSMIT INTERFERENCE USER ID, BANDWIDTH (NUMBER OF RB), AND START RB POSITION FOR EACH INTERFERENCE USER |

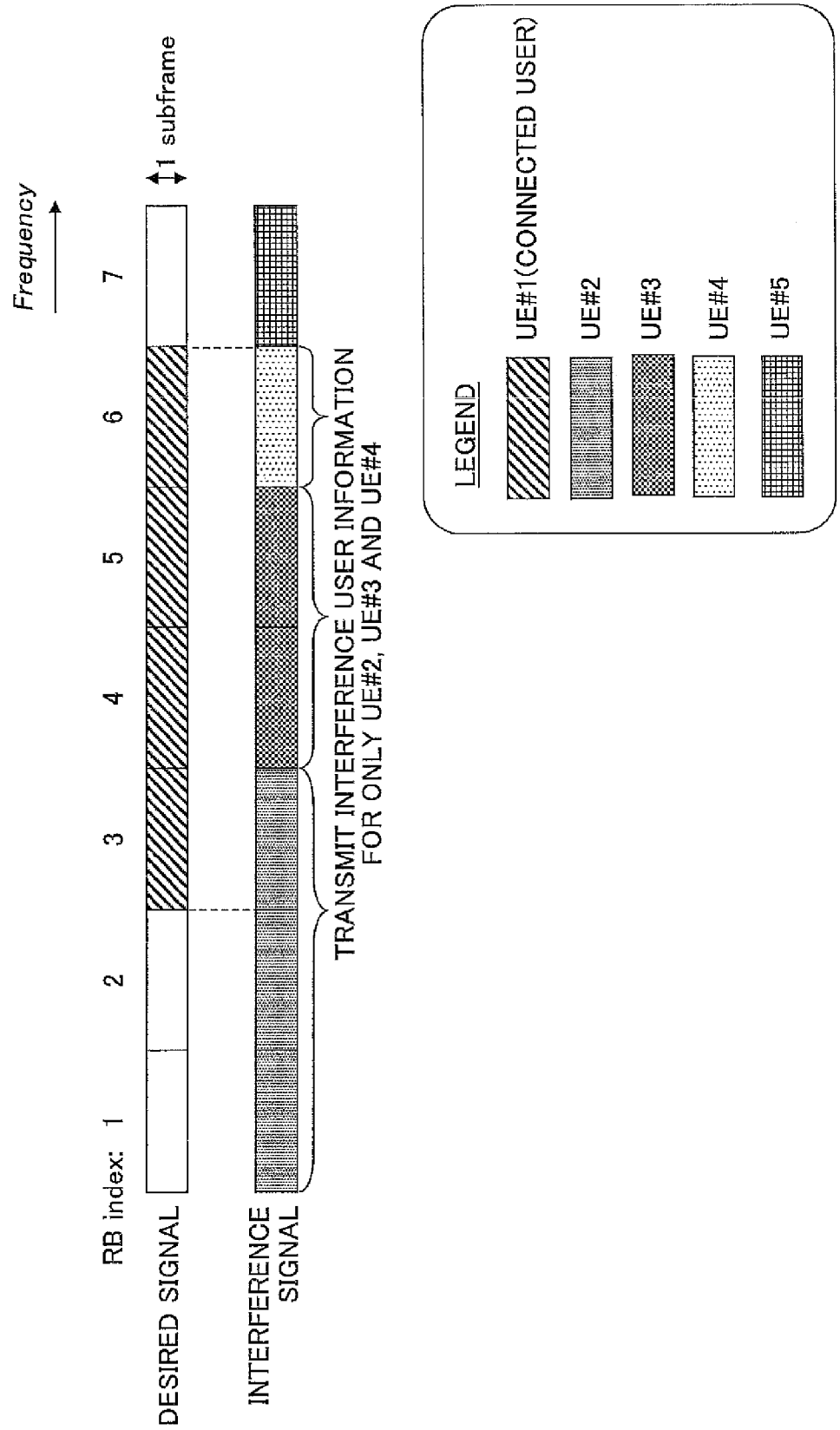

FIG.13

| CONTROL INFORMATION TYPE | SIGNAL TYPE | TRANSMISSION TARGET | INFORMATION ELEMENT |
|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | CELL ID OF INTERFERENCE CELL |
| | | | groupHoppingEnabled |
| | | | sequenceHoppingEnabled |
| | | | groupAssignmentPUSCH |
| | | | cyclicShift |
| | | TRANSMIT INDIVIDUAL PARAMETER TO UE | (groupHoppingDisabled + INTERFERENCE USER ID) * NUMBER OF INTERFERENCE USERS |
| | | | (nPUSCH-Identity, nDMRS-CSH-Identity + INTERFERENCE USER ID) * NUMBER OF INTERFERENCE USERS |
| DYNAMIC CONTROL INFORMATION | DCI | TRANSMIT INDIVIDUAL PARAMETER TO UE | SLOT NUMBER OF INTERFERENCE CELL (NOT NECESSARY IN CASE OF COMPLETE SYNCHRONIZATION) |
| | | | INTERFERENCE USER ALLOCATION INFORMATION (TRANSMIT INFORMATION RELATED TO ONLY DESIRED SIGNAL ALLOCATION PORTION) EX: TRANSMIT INTERFERENCE USER ID, BANDWIDTH (NUMBER OF RB), AND START RB POSITION FOR EACH INTERFERENCE USER |

FIG.14

| CONTROL INFORMATION TYPE | SIGNAL TYPE | TRANSMISSION TARGET | INFORMATION ELEMENT |
|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | CELL ID OF INTERFERENCE CELL |
| | | | groupHoppingEnabled |
| | | | sequenceHoppingEnabled |
| | | | groupAssignmentPUSCH |
| | | | cyclicShift |
| | | TRANSMIT INDIVIDUAL PARAMETER TO UE | (groupHoppingDisabled + INTERFERENCE USER ID) * NUMBER OF INTERFERENCE USERS |
| | | | (nPUSCH-Identity, nDMRS-CSH-Identity + INTERFERENCE USER ID) * NUMBER OF INTERFERENCE USERS |
| DYNAMIC CONTROL INFORMATION | DCI | TRANSMIT INDIVIDUAL PARAMETER TO UE | (CYCLIC SHIFT AMOUNT (INDEX INFORMATION) IS CAUSED TO BE ANY ONE BIT OF ODD NUMBER OR EVEN NUMBER + INTERFERENCE USER ID) * NUMBER OF INTERFERENCE USERS |
| | | | SLOT NUMBER OF INTERFERENCE CELL (NOT NECESSARY IN CASE OF COMPLETE SYNCHRONIZATION) |
| | | | INTERFERENCE USER ALLOCATION INFORMATION (TRANSMIT INFORMATION RELATED TO DESIRED SIGNAL ALLOCATION PORTION ONLY) EX: TRANSMIT INTERFERENCE USER ID, BANDWIDTH (NUMBER OF RB), AND START RB POSITION FOR EACH INTERFERENCE USER |

FIG.15

| CONTROL INFORMATION TYPE | SIGNAL TYPE | TRANSMISSION TARGET | INFORMATION ELEMENT |
|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | CELL ID OF INTERFERENCE CELL |
| | | | groupHoppingEnabled |
| | | | sequenceHoppingEnabled |
| | | | groupAssignmentPUSCH |
| | | | cyclicShift |
| | | TRANSMIT INDIVIDUAL PARAMETER TO UE | (groupHoppingDisabled + INTERFERENCE USER ID) * NUMBER OF INTERFERENCE USERS |
| | | | (nPUSCH-Identity, nDMRS-CSH-Identity + INTERFERENCE USER ID) * NUMBER OF INTERFERENCE USERS |
| DYNAMIC CONTROL INFORMATION | DCI | TRANSMIT INDIVIDUAL PARAMETER TO UE | (CYCLIC SHIFT AMOUNT + INTERFERENCE USER ID) * NUMBER OF INTERFERENCE USERS |
| | | | SLOT NUMBER OF INTERFERENCE CELL (NOT NECESSARY IN CASE OF COMPLETE SYNCHRONIZATION) |
| | | | INTERFERENCE USER ALLOCATION INFORMATION (TRANSMIT INFORMATION RELATED TO DESIRED SIGNAL ALLOCATION PORTION ONLY) EX: TRANSMIT INTERFERENCE USER ID AND A BIT INDICATING WHETHER BANDWIDTH (NUMBER OF RB) IS EQUAL TO OR MORE THAN THREE FOR EACH INTERFERENCE USER |

FIG.20

| SIGNAL FOR INTERFERENCE REDUCTION PROCESS | INTERFERENCE REDUCTION PROCESS METHOD |
|---|---|
| REFERENCE SIGNAL FOR CHANNEL QUALITY MEASUREMENT (SRS) | PERFORM CHANNEL ESTIMATION BASED ON SRS AND CANCEL BY USING SRS SEQUENCE |

FIG.21

| PARAMETER TYPE | SIGNAL TYPE | TRANSMISSION TARGET | INFORMATION ELEMENT | CONTENTS | |
|---|---|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | groupHoppingEnabled | SIGNALING TO TURN IT ON TO CHANGE AMONG 30 DIFFERENT KINDS OF SEQUENCES IN TERMS OF TIME BASED ON SLOT NUMBER, CELL ID (OR VIRTUAL CELL ID) AND SEQUENCE SHIFT PATTERN | VALUE TRANSMITTED BY PUSCH DMRS SEQUENCE IS USED |
| | | | sequenceHoppingEnabled | SIGNALING TO TURN IT ON TO CHANGE BETWEEN TWO GROUPS, EACH OF WHICH INCLUDES 30 DIFFERENT KINDS OF SEQUENCES, IN TERMS OF TIME BASED ON SLOT NUMBER, CELL ID (OR VIRTUAL CELL ID) AND SEQUENCE SHIFT PATTERN | |
| | | | groupAssignmentPUSCH | PARAMETER OF THE ABOVE HOPPING, INCLUDING POSITIVE VALUES 0 THROUGH 29 | |
| | | | cyclicShift | PARAMETER FOR DETERMINING PHASE ROTATION AMOUNT AND INTER-TRANSMIT-LAYER MULTIPLEXING CODE OF SEQUENCE, DEFINED BY 8 KINDS OF VALUES | |
| | | | srs-BandwidthConfig | SET OF CELL-SPECIFIC SRS BANDWIDTH: ONE PATTERN OF EIGHT PATTERNS IS TRANSMITTED | |
| | | | srs-SubframeConfig | SET INDICATING CELL-SPECIFIC SRS MULTIPLEXED SUBFRAME: ONE PATTERN OF SIXTEEN PATTERNS IS TRANSMITTED | |
| | | | ackNackSRS-SimultaneousTransmission | WHETHER TO ALLOW TRANSMITTING ACK/NACK AND SRS IN THE SAME SUBFRAME: YES OR NO IS TRANSMITTED | |
| | | | srs-MaxUpPts | PARAMETER IN SPECIAL SUBFRAME OF TDD: WHETHER TO USE OR NOT IS TRANSMITTED | |
| | | TRANSMIT INDIVIDUAL PARAMETER TO UE | srs-Bandwidth | SRS BANDWIDTH FOR EACH UE: ONE PATTERN OF FOUR PATTERNS IS TRANSMITTED | TRANSMITTED BY SRS PERIODIC/ APERIODIC TRANSMISSION |
| | | | freqDomainPosition | POSITION OF FREQUENCY AREA OF SRS FOR EACH UE: VALUE FROM 0 TO 24 IS TRANSMITTED | |
| | | | srs-ConfigIndex | TRANSMISSION PERIOD AND SUBFRAME POSITION OF SRS FOR EACH UE: VALUE FROM 0 TO 1023 (0 TO 31 FOR APERIODIC) IS TRANSMITTED | |
| | | | transmissionComb | WHETHER SRS IS FREQUENCY DIVISION MULTIPLEXED OR NOT: 0 OR 1 IS TRANSMITTED | |
| | | | cyclicShift | SRC CYCLIC SHIFT AMOUNT FOR EACH UE: ONE PATTERN OF EIGHT PATTERNS IS TRANSMITTED | |
| | | | srs-AntennaPort | NUMBER OF ANTENNA PORTS USED IN SRS FOR EACH UE: 1, 2, OR 4 IS TRANSMITTED | |
| | | | srs-HoppingBandwidth | SRS FREQUENCY HOPPING VALUE FOR EACH UE: VALUE FROM 0 TO 4 IS TRANSMITTED | |
| | | | duration | WHETHER SRS IS SENT ONLY ONCE OR CONTINUOUSLY IS TRANSMITTED | |

FIG.23

| PARAMETER TYPE | SIGNAL TYPE | TRANSMISSION TARGET | INFORMATION ELEMENT | |
|---|---|---|---|---|
| SEMI-STATIC CONTROL INFORMATION | RRC SIGNALING | TRANSMIT COMMON PARAMETER IN A CELL (COMMON PARAMETER FOR ALL UE IN A CELL) | groupHoppingEnabled | TRANSMIT NUMBER OF INTERFERENCE CELL TIMES |
| | | | sequenceHoppingEnabled | |
| | | | groupAssignmentPUSCH | |
| | | | cyclicShift | |
| | | | srs-BandwidthConfig | |
| | | | srs-SubframeConfig | |
| | | | ackNackSRS-SimultaneousTransmission | |
| | | | srs-MaxUpPts | |
| | | TRANSMIT INDIVIDUAL PARAMETER TO UE | srs-Bandwidth | TRANSMIT NUMBER OF INTERFERENCE USER TIMES BY ASSOCIATING WITH INTERFERENCE USER ID |
| | | | freqDomainPosition | |
| | | | srs-ConfigIndex | |
| | | | transmissionComb | |
| | | | cyclicShift | |
| | | | srs-AntennaPort | |
| | | | srs-HoppingBandwidth | |
| | | | duration | |

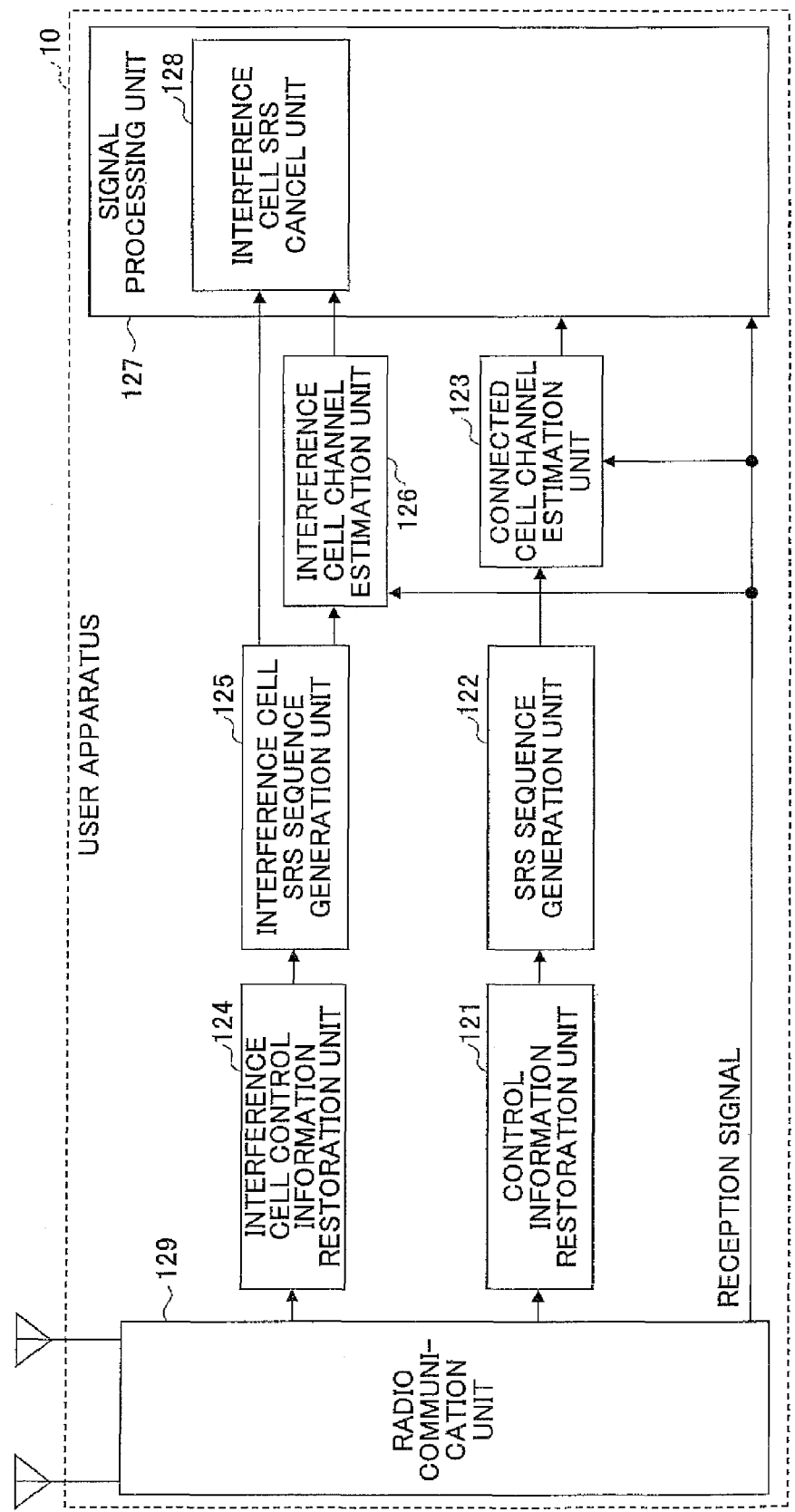

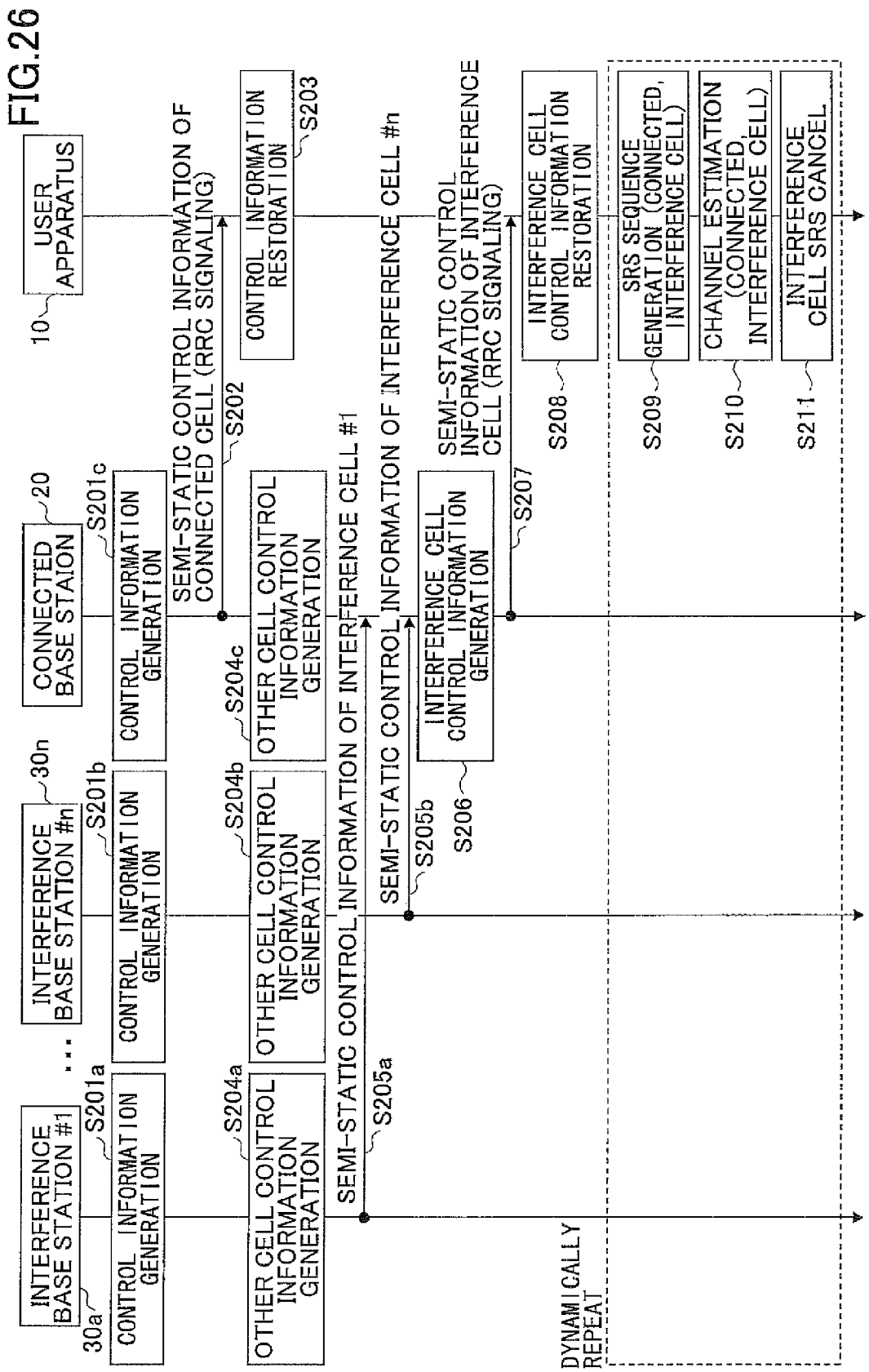

BASE STATION, USER APPARATUS AND INTERFERENCE REDUCTION METHOD

TECHNICAL FIELD

The present invention relates to a base station and a user apparatus of a radio communication system.

BACKGROUND ART

In a radio communication system such as a 3GPP (Third Generation Partnership Project) LTE (Long Term Evolution) Advanced system, a reduced throughput caused by interference at a user apparatus (UE: User Equipment) is a problem. The interference occurs, for example, in the following cases illustrated in FIG. 1:
- a case where a user apparatus #1 residing in a connected cell (a serving cell of a connected base station) receives an interference signal by a radio beam from the connected base station to a user apparatus #2 on the same resource in MU-MIMO (multi-user multiple-input multiple-output), and
- a case where the user apparatus #1 receives an interference signal from another cell as an interference cell (an interference cell of an interference base station).

Therefore, in the LTE-Advanced, regarding downlink communication, technologies for reducing the interference have been studied in which the user apparatus suppresses the interference signal described above or removes (cancels) the received interference signal. As interference reduction technologies, there are, for example, an interference rejection combining (IRC) reception and a successive interference cancellation (SIC).

<Interference Rejection Combining (IRC) Reception>

The IRC reception is a technology in which a desired signal is obtained by separating the desired signal from a reception signal which includes an interference signal and the desired signal. The IRC is a technology in which, regarding the downlink communication, a corresponding weight (reception weight) is applied to each signal obtained at each of reception antennas in order for the user apparatus to suppress interference directed to the desired radio beam from the connected base station created by interference radio beams from the interference base stations and by signals transmitted to other users by the connected base station.

The reception weight is calculated from a formula derived from a minimum mean squared error (MMSE) algorithm shown in FIG. 2. It should be noted that there are two methods (Type1, Type2) for calculating the weight: a method in the case where it is possible to estimate a channel of the interference signal and a method in the case where it is not possible to estimate a channel of the interference signal. The formula shown in FIG. 2 is a formula in the case where it is possible to estimate a channel of the interference signal (Type1). It should be noted that the technology in which the reception weight is calculated by using the formula shown in FIG. 2 is a known technology.

In the formula shown in FIG. 2, the underlined portion is a covariance matrix which includes a channel matrix of the interference cell. Further, the channel matrix of the interference cell is obtained by performing channel estimation using a reference signal from the interference cell. Here, the channel estimation uses, for example, a two-dimensional MMSE channel estimation filter described in non-patent document 1. It should be noted that in LTE Advanced, the reference signals which can be used for the channel estimation include a Cell-specific Reference Signal (CRS), a CSI Reference Signal (CSI-RS), a Demodulation Reference Signal (DMRS), etc.

<Successive Interference Cancellation (SIC)>

SIC is a technology for separating the desired signal from a reception signal which includes an interference signal and the desired signal. The SIC is a technology in which the desired signal is extracted by: creating a replica signal of the interference signal from the received signal by using hard decision or soft decision; and successively subtracting (removing) the replica signal from the received signal. A functional configuration of a user apparatus which performs SIC is shown in FIG. 3. As shown in FIG. 3, the user apparatus performs a process of SIC by, for each of a plurality of interference signals, performing channel estimation of the interference signal, demodulating the interference signal based on the channel estimation, creating a replica, and subtracting the replicas successively from the received signal.

As described above, in order to perform IRC reception or SIC, it is necessary for the user apparatus to perform channel estimation of the interference signal.

Further, in 3GPP Rel. 12, Dynamic TDD (Time Division Duplex) in which uplink/downlink resource configurations of multiple cells are dynamically changed, and device-to-device (D2D) communications have been studied.

<Dynamic TDD>

In TDD of the conventional LTE, in order to suppress interference between the uplink and the downlink, as shown in FIG. 4(a), a cell #1 of a base station #1 and a cell #2 of another neighboring base station #2 have the same resource configuration (uplink/downlink/Special Subframe). In an example of FIG. 4(a), for each of the subframe numbers "0" through "9", the resource of the cell #1 and the corresponding resource of the cell #2 are the same. Further, the resource configurations are changed at a long time period (e.g., from at a several-hour period to a one-day period) according to traffic situations of the cells (cell #1, cell #2).

On the other hand, in Dynamic TDD, as shown in FIG. 4(b), in the multiple cells (cell #1, cell #2), the uplink/downlink resource configurations are dynamically changed according to the traffic situations, etc. In an example of FIG. 4(b), different resources are assigned in different cells. For example, the resource of the cell #1 corresponding to the subframe number "3" is "uplink", while the resource of the cell #2 corresponding to the subframe number "3" is "downlink". Further, in this example, a situation is shown in which, for the subframe numbers "0" through "9", more resources are dynamically assigned to downlink in the cell #2 because there is more downlink traffic in the cell #2. In this way, resources can be efficiently used in Dynamic TDD.

In Dynamic TDD, however, interference occurs between the uplink and downlink because different cells have different resource configurations.

<Device-to-Device (D2D) Communications>

As shown in FIG. 5, it has been studied to use the uplink in TDD for device-to-device communications between a user apparatus #2 and a user apparatus #3. It should be noted that although in an example of FIG. 5, a case is shown in which FDD (Frequency Division Duplex) is used for communications between the base station and the user apparatuses, TDD may also be used.

Therefore, the user apparatus #1 which is near the user apparatuses #2 and #3 performing the device-to-device communications receives an uplink interference signal used for the device-to-device communications.

In this way, there is a problem that if the uplink signal, used for Dynamic TDD or the device-to-device communications, is received while a user apparatus is receiving the desired downlink signal, the uplink signal causes interference and the downlink reception quality at the user apparatus is degraded.

RELATED ART DOCUMENT

[NON-PATENT DOCUMENT 1] P. Hoeher et. al., "Two-dimensional pilot-symbol-aided channel estimation by Wiener filtering," Proc. ICASSP '97, 1997

[NON-PATENT DOCUMENT 2] Bo Yu, Sayandev Mukherjee, Hiroyuki Ishii, Liuqing Yang, "Dynamic TDD support in the LTE-B enhanced Local Area architecture"

[NON-PATENT DOCUMENT 3] Mohammed Al-Rawi, Riku Jantti, "A Dynamic TDD Inter-Cell Interference Coordination scheme for Long Term Evolution Networks"

[NON-PATENT DOCUMENT 4] LEI LEI AND ZHANGDUI ZHONG, CHUANG LIN, XUEMIN (SHERMAN) SHEN, "OPERATOR CONTROLLED DEVICE-TO-DEVICE COMMUNICATIONS IN LTE-ADVANCED NETWORKS" IEEE Wireless Communications, June 2012

SUMMARY OF THE INVENTION

Problem to be Solved by the Invention

Here, in technologies such as IRC and SIC described above specified in an already-defined 3GPP Rel. 11 and an under-study Rel. 12, the target of interference reduction is the downlink interference signal only, which is a problem. Further, in embodiments of prior applications related to the present application (Patent applications No. 2012-288896, No. 2013-017715, and No. 2013-071067), the disclosed technologies are all related to downlink interference signal reduction.

Therefore, even if the above interference reduction technologies are applied, the uplink interference signal cannot be reduced and the above problem cannot be solved.

Therefore, the present invention has been made in view of the above. It is an object of the present invention to reduce the uplink interference signal by causing the connected base station to transmit control information for reducing an uplink interference signal to a user apparatus, and by causing the user apparatus, when receiving a desired downlink signal, to reduce the uplink interference signal by using the transmitted control information.

Means for Solving the Problem

In order to solve the above problem, in an embodiment of the present invention, a base station connected to a user apparatus in a radio communication system includes a receiving unit, in order to reduce an uplink interference signal from cells formed by one or more interference base stations for the user apparatus or from other user apparatuses, configured to receive from each of the interference base stations first control information to be used by the user apparatus; a generating unit configured to generate second control information based on one or more pieces of the first control information received from the interference base stations; and a transmitting unit configured to transmit the second control information to the user apparatus by a downlink control signal.

Further, a user apparatus in a radio communication system including a plurality of base stations is disclosed. The user apparatus includes a receiving unit configured to receive control information to be used for reducing an uplink interference signal from a cell formed by an interference base station for the user apparatus transmitted from a connected base station by a downlink control signal; and an interference reducing unit configured to, using the control information, reduce the interference signal and obtain a desired signal from the connected base station.

Further, a method of interference reduction for reducing an uplink interference signal from cells formed by interference base stations for a user apparatus connected to a connected base station in a radio communication system or from another user apparatus is disclosed. The method includes a first receiving step, by the connected base station, of receiving first control information for each of the interference base stations to be used by the user apparatus for reducing the interference signal; a generating step, by the connected base station, of generating second control information based on one or more pieces of the first control information; a transmitting step, by the connected base station, of transmitting the second control information to the user apparatus by a downlink control signal; a receiving step, by the user apparatus, of receiving the second control information transmitted from the connected base station; and an interference reducing step, by the user apparatus, of reducing the interference signal by using the second control information and obtaining the desired signal from the connected base station.

Effect of the Present Invention

According to the embodiments of the present invention, it is possible to reduce the uplink interference signal by causing the connected base station to transmit control information for reducing an uplink interference signal to a user apparatus, and by causing the user apparatus, when receiving a desired downlink signal to reduce the uplink interference signal by using the transmitted control information.

BRIEF DESCRIPTION OF THE DRAWINGS

FIG. 2 is a drawing illustrating an interference rejection combining (IRC) reception.

FIG. 6 is a schematic configuration diagram of a radio communication system in an embodiment of the present invention.

FIG. 7 is a drawing illustrating uplink interference signals which is targeted for interference reduction.

FIG. 8 is a drawing illustrating an interference reduction method in a first embodiment.

FIG. 9 is a drawing illustrating control information of the connected cell used for DMRS sequence estimation and channel estimation.

FIG. 10 is a drawing illustrating an uplink frame configuration and a user allocation image.

FIG. 11 is a drawing illustrating control information of the interference cell used for DMRS sequence estimation and channel estimation in a first embodiment.

FIG. 12 is drawing illustrating an example of interference user allocation information to be transmitted.

FIG. 13 is a drawing illustrating control information of the interference cell in a case 1 of a first modified example.

FIG. 14 is a drawing illustrating control information of the interference cell in a case 2 of the first modified example.

FIG. 15 is a drawing illustrating an example of control information of the interference cell in a second modified example.

FIG. 20 is a drawing illustrating an interference reduction method in a second embodiment.

FIG. 21 is a drawing illustrating control information of the connected cell used for SRS sequence estimation and channel estimation.

FIG. 23 is a drawing illustrating control information of the interference cell used for SRS sequence estimation and channel estimation in the second embodiment.

FIG. 25 is a drawing illustrating a functional configuration of the user apparatus in the second embodiment of the present invention.

FIG. 26 is a sequence diagram illustrating an operation procedure of the radio communication system in the second embodiment of the present invention.

EMBODIMENTS FOR CARRYING OUT THE INVENTION

Figure 1:
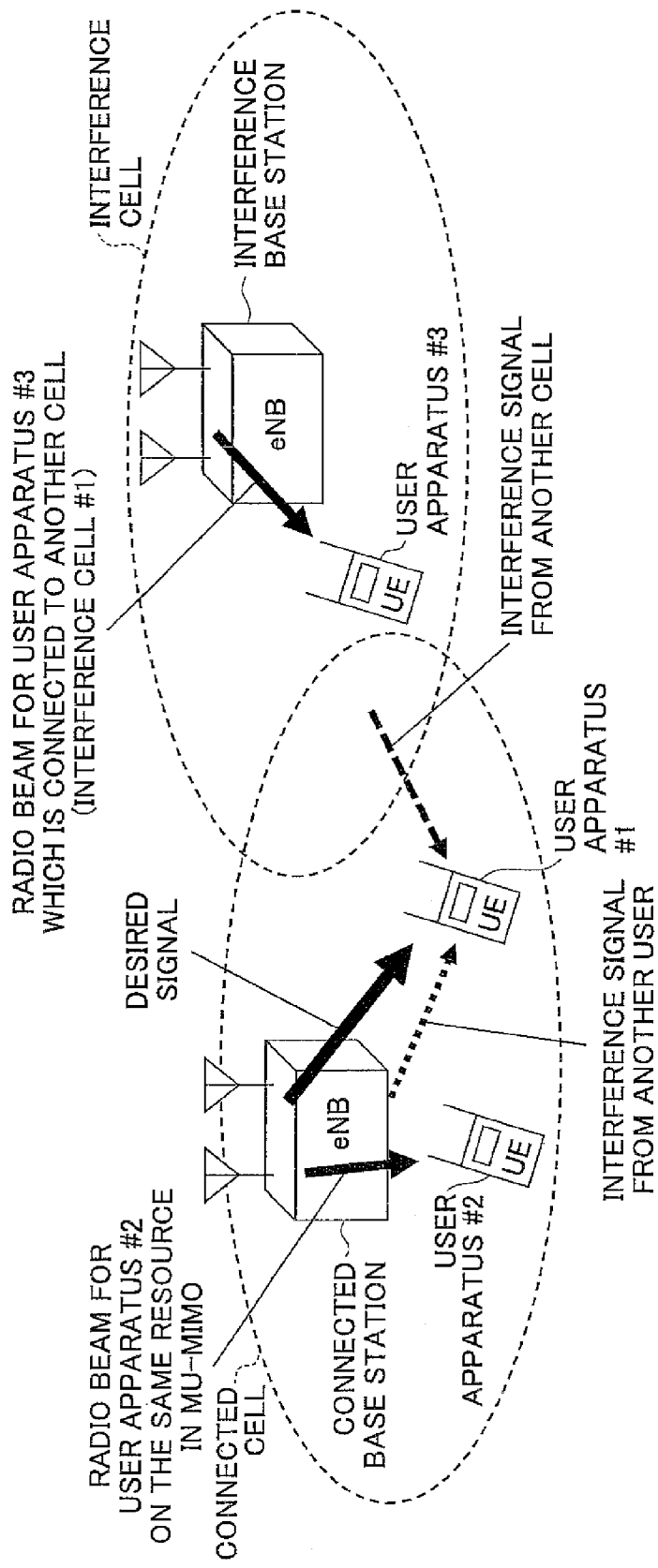
FIG. 1 is a drawing illustrating a case where interference occurs in a radio communication system.
Figure 3:
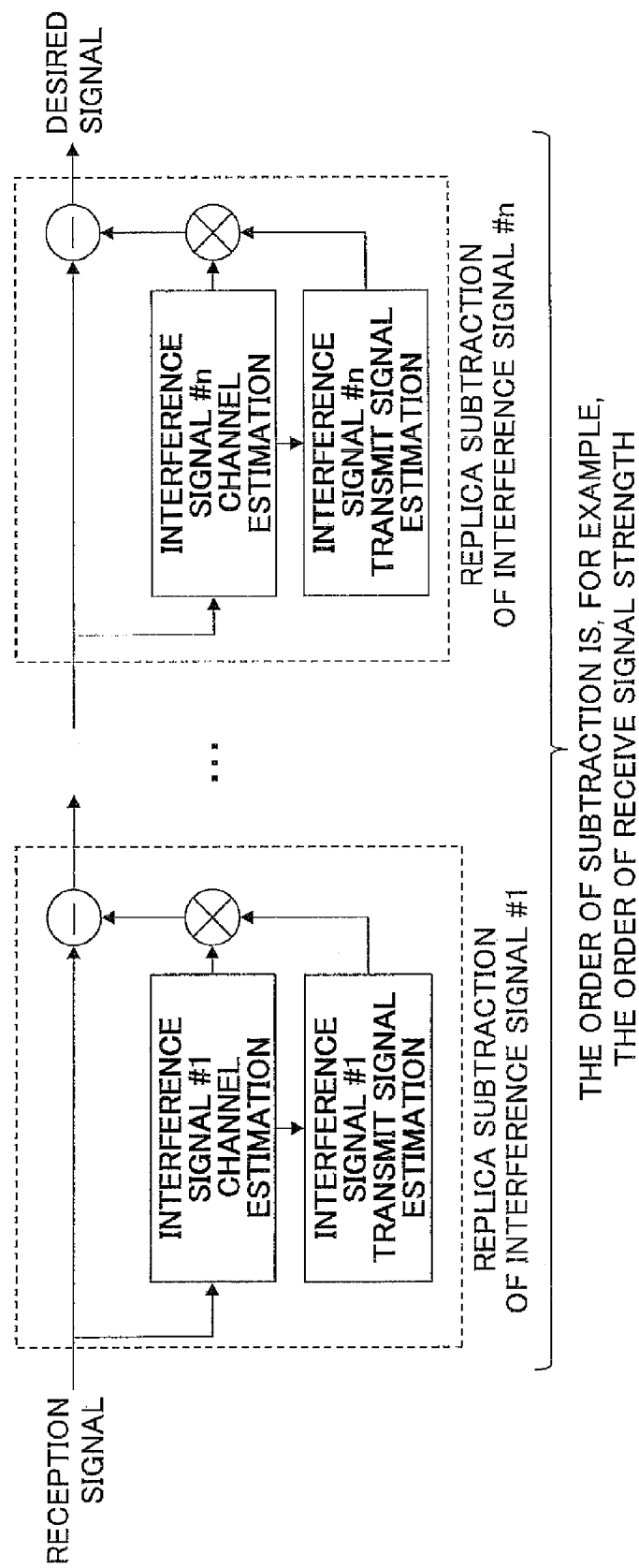
FIG. 3 is a drawing illustrating a functional configuration of a user apparatus performing a successive interference cancellation (SIC).
Figure 4:
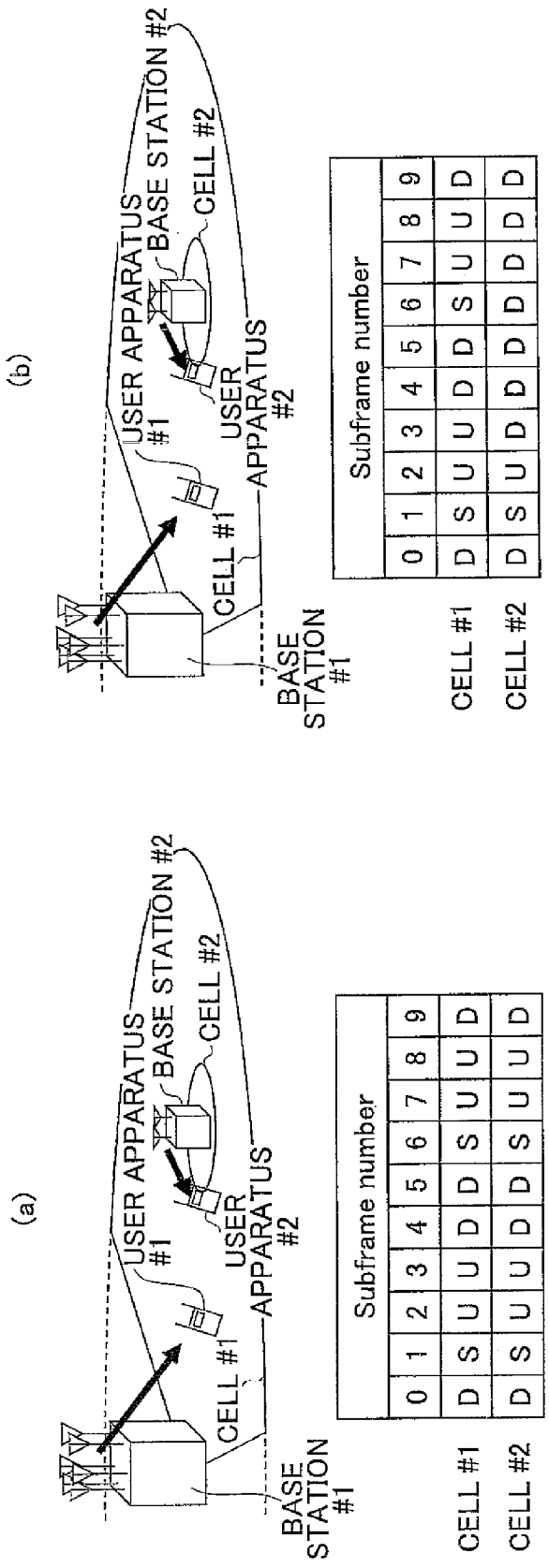
FIG. 4 is a drawing illustrating resource configurations in conventional TDD and in Dynamic TDD.
Figure 5:
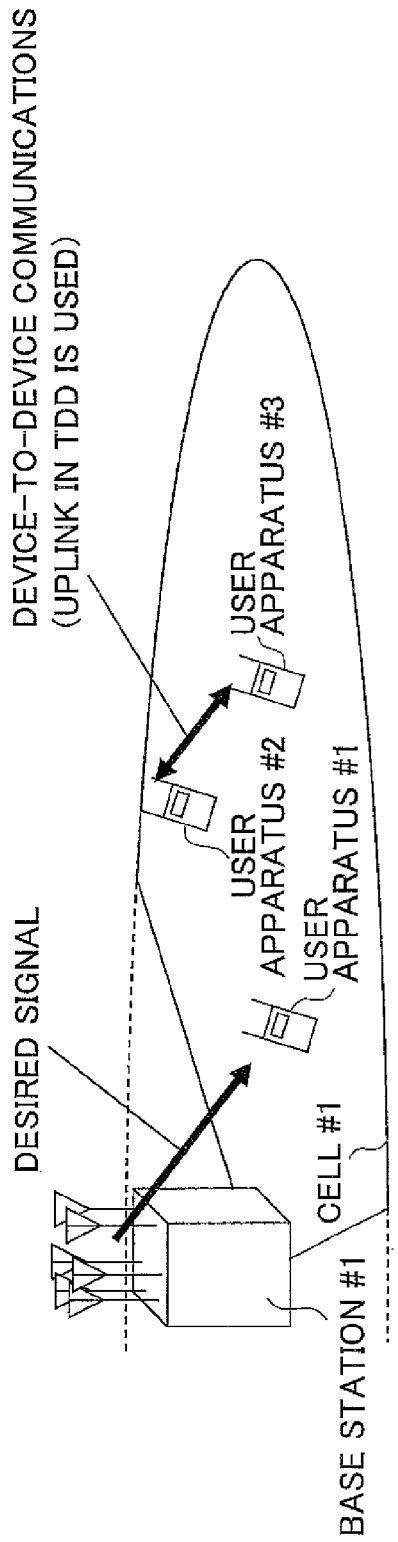
FIG. 5 is a drawing illustrating resources used in device-to-device communications.

In the following, referring to the drawings, embodiments of the present invention will be described. It should be noted that the embodiments described below are merely examples, and that the present invention is not limited to the following embodiments. In the following, processes of interference suppression and cancellation are collectively referred to as interference reduction.

It is assumed that the user apparatus in the embodiments includes, but is not limited to, a mobile communication terminal such as a portable telephone, a smartphone, a tablet, etc. Further, in the embodiments, the mobile communication network to which the user apparatus is connected is a network based on LTE. But the network to which the present invention can be applied is not limited to such a network. It should be noted that the meaning of "LTE" used in the embodiments is not limited to communication methods corresponding to 3GPP Rel. 8 through Rel. 10, but includes communication methods corresponding to 3GPP Rel. 11 and Rel. 12.

[System Configuration]

FIG. 6 illustrates a schematic configuration diagram of a radio communication system in an embodiment of the present invention. The system in the embodiment of the present invention is, for example, a radio communication system based on LTE Advanced scheme. A connected base station 20 (eNodeB) forms a connected cell and a user apparatus 10 (UE) in the cell communicates with the connected base station 20 by a desired signal. The radio communication system includes at least a function specified in LTE Advanced. Application of the present invention is, however, not limited to LTE Advanced scheme. The present invention may be applied to a generation later than LTE Advanced, or to schemes other than LTE scheme.

Usually, many base stations are included in a radio communication system. However, in FIG. 6, only a connected base station 20 and an interference base station 30, which is a neighboring base station, are shown. In the present embodiment, functions of the connected base station 20 are the same as those of the interference base station 30. A signal transmitted from the interference base station 30 to a user apparatus 11, whose connected base station is the interference base station 30, is an interference signal for a user apparatus 10. Therefore, in order to distinguish from the connected base station 20 to which the user apparatus 10 is connected, a base station neighboring the connected base station 20 is referred to as an interference base station 30. In general, there are multiple interference base stations 30 for the connected base station 20, but in an example of FIG. 6, only one interference base station 30 is shown.

An operation overview of the radio communication system of the present embodiment will be described.

As shown in FIG. 6, in step S1, the user apparatus 10 is receiving an uplink interference signal from the interference cell (interference base station 30).

In step S2, control information which is used for interference reduction of uplink interference signals by the user apparatus 10 is transmitted from the interference base station 30 to the connected base station 20.

It should be noted that uplink interference signals which are targets of interference reduction in the embodiment of the present invention are shown in FIG. 7. As shown in FIG. 7, the uplink interference signals which are the targets of interference reduction are a physical uplink shared channel (PUSCH), a demodulation reference signal (DMRS) which is used for demodulating the PUSCH, and a channel quality measurement reference signal (SRS: Sounding Reference Signal). It should be noted that although DMRS is also used for demodulating a physical uplink control channel (PUCCH), it is a DMRS used for demodulating PUSCH (multiplexed in the PUSCH) that is the target of interference reduction in the embodiment of the present invention. In the following description, the DMRS for PUSCH demodulation is simply referred to as DMRS.

Referring again to FIG. 6, in step S3, the connected base station 20 transmits control information of the connected cell and control information of the interference cell by using a channel for physical layer control signal transmission. The channel for physical layer control signal transmission is, for example, a Physical Downlink Control CHannel (PDCCH). Further, control information transmitted by PDCCH is included in higher layer signaling such as RRC signaling or a Downlink Control Information (DCI) format.

In step S4, the user apparatus 10 performs interference reduction of uplink interference signals based on the control information transmitted by the connected base station 20. It should be noted that the interference reduction is a process including IRC reception, SIC, or the like which is performed based on a result of channel estimation of uplink interference signal estimated by using the control information of the interference cell.

As described above, in the radio communication system of the embodiment of the present invention, the connected base station 20 transmits to the user apparatus 10 the control information which is used for interference reduction of the uplink interference signals of the interference cell. Further, the user apparatus 10 performs interference reduction of the uplink interference signals based on the control information transmitted by the connected base station 20.

In the following description, based on the types of the interference signals which are the targets of interference reduction as shown in FIG. 7, it is defined that a case where DMRS and PUSCH are the target interference signals is referred to as a first embodiment and that a case where SRS is the target interference signal is referred to as a second embodiment.

In the following, the first embodiment and the second embodiment will be described by using corresponding specific examples. It should be noted that apparatus configurations (functional configurations) and operations based on the configurations will be described after the end of corresponding embodiment descriptions.

First Embodiment

Interference Reduction Method

Interference reduction method of target signals in the first embodiment is shown in FIG. 8. As shown in FIG. 8, the user apparatus 10, regarding the DMRS interference signal, performs channel estimation of a data area for PUSCH (PUSCH area) according to the DMRS, and cancels the interference signal using the DMRS sequence. Further, regarding the PUSCH interference signal, by using the result of channel estimation according to the DMRS, the interference signal is suppressed (IRC reception) or cancelled (SIC, data sequence is estimated by, for example, blind estimation.)

The user apparatus 10 performs channel estimation of the PUSCH area according to the DMRS based on the DMRS sequence generated in the user apparatus 10.

<Control Information of the Connected Cell>

Control information shown in FIG. 9 is necessary for DMRS sequence generation and for channel estimation according to the DMRS, and is transmitted from the connected base station 20 to the user apparatus 10.

As shown in FIG. 9, the types of control information necessary for DMRS sequence generation and channel estimation include semi-static control information which is control information semi-statically transmitted to the user apparatus 10 and dynamic control information which is control information dynamically transmitted to the user apparatus 10. Further, the semi-static control information is transmitted by RRC signaling as high layer signaling and includes information elements which are transmitted as parameters common to all user apparatuses in the cell and information elements which are transmitted as parameters specific to each user apparatus 10. The dynamic control information is dynamically (e.g., at one subframe cycle) transmitted by DCI and includes information elements of parameters specific to individual user apparatuses 10.

It should be noted that an example of an uplink frame configuration is shown in FIG. 10(*a*) and a resource allocation image for each user apparatus (UE) 10 is shown in FIG. 10(*b*). As shown in FIG. 10, DMRS and SRS are multiplexed into PUSCH.

<Control Information of the Interference Cells>

In the first embodiment, in order for generation of DMRS sequences of the interference cells and channel estimation according to DMRS to be performed, control information (DMRS information) of the interference cells is transmitted from the connected base station 20 to the user apparatus 10. The connected base station 20 generates the control information of the interference cells based on the control information of the interference cells transmitted from the interference base stations 30 as shown in FIG. 11. As shown in FIG. 11, different from the control information of the connected cell, the semi-static control information in the control information of the interference cells generated by the connected base station 20 includes a number of interference cells times (the cell ID, groupHoppingEnabled, sequenceHoppingEnabled, groupAssignmentPUSCH and cyclicShift of the respective interference cells). Further, the generated semi-static control information of the interference cells includes a number of interference users times (the cell ID, groupHoppingDisabled and nPUSCH-Identity/nDMRS-CSH-Identity of the respective interference users). Further, the generated dynamic control information includes the number of the interference users times (the user ID and the cyclic shift amount of the respective interference users), slot numbers of the interference cells (which are not necessary in case of complete synchronization), and interference user allocation information. It should be noted that regarding the interference user allocation information (also referred to as "interference user information"), as shown in FIG. 12, only the interference user information of a UE#2, a UE#3, and a UE#4 corresponding to the resource blocks (RBs) in the desired signal to which blocks the connected user (UE#1) is allocated is transmitted to the user apparatus 10 (in other words, the interference user information of a UE#5 is not transmitted to the user apparatus 10). In this way, from the connected base station 20, the interference user allocation information of only the users to which the RB of the interference signal corresponding to the RB of the desired signal assigned to the user apparatus 10 is transmitted to the user apparatus 10. In other words, interference user allocation information of an unnecessary user who is not related to interference signal reduction at the user apparatus 10 is controlled not to be transmitted to the user apparatus 10.

As described above, in the radio communication system of the first embodiment of the present invention, the user apparatus 10, by using the result of channel estimation of the PUSCH area performed based on the control information of the interference cells and the generated DMRS sequence shown in FIG. 11, cancels DMRS as an interference signal. Further, the user apparatus 10, by using the above channel estimation result, performs IRC reception for the PUSCH as an interference signal to suppress the interference signal. Alternatively, the user apparatus 10 estimates a modulation signal of the PUSCH as the interference signal, performs SIC by using the above channel estimation result, and cancels interference signals.

The First Modified Example

In the first modified example of the first embodiment, in order to reduce signal amounts of the downlink control signal transmitted from the connected base station 20 to the user apparatus 10, some information elements to be transmitted are removed from the information elements shown in FIG. 11 or information amounts included in information elements are reduced. In the following description, in the first modified example, a case in which some information elements of the control information of the interference cells are removed is referred to as case 1, a case in which information amounts included in the information elements are reduced is referred to as case 2, and the cases will be described below.

<Case 1 (a Case in which Some Information Elements are Removed)>

Control information of the interference cells in the case 1 of the first modified example is shown in FIG. 13. As shown in FIG. 13, in the case 1 of the first modified example, in the information elements included in the control information of the interference cell shown in FIG. 11, the information element of "(cyclic shift amount+interference user ID)*a number of interference users" which is transmitted by using DCI is removed. With the removal of information element, compared to the case of the first embodiment (FIG. 11), in the DCI which is dynamically transmitted from the connected base station 20 to the user apparatus 10, a number of interference users times of information amounts can be reduced.

In this case, as the definition of the cyclic shift amount includes eight kinds of values for each user, that is, there exist eight patterns for each user, the user apparatus 10 to which the control information of the interference cell is transmitted can estimate the channel of the interference signal by using the eight patterns of sequence for each interference user. Specifically, for example, the user apparatus 10 determines a channel whose measured interference noise power (power of interference signal) is the highest in the eight channels which are estimated based on the eight patterns of sequence for each interference user as the channel estimation result.

<Case 2 (a Case in which Information Amounts Included in the Information Element are Reduced>

Control information of the interference cell in the case 2 of the first modified example is shown in FIG. 14. As shown in FIG. 14, in the case 2 of the first modified example, in the information element "(cyclic shift amount+interference user ID)*the number of interference users", the number of "cyclic shift amount" patterns is reduced to four by causing the eight patterns of index information of "cyclic shift amount" to be any one bit of odd number or even number.

In this case, the user apparatus 10 to which the control information of the interference cell is transmitted estimates channels of interference signals using four patterns of sequences according to the four patterns of cyclic shift amounts for which any one bit of odd number or even number for each interference user is set. Specifically, for example, the user apparatus 10 determines a channel whose interference noise power is the highest in the four channels which are estimated based on the total four patterns of sequences for each interference user as the channel estimation result.

It should be noted that the interference reduction method of the interference signal in the first modified example is the same as the method in the case of the first embodiment shown in FIG. 8.

The Second Modified Example

In the second modified example of the first embodiment, in order to reduce signal amounts of the downlink control signal transmitted from the connected base station 20 to the user apparatus 10, information included in "interference user allocation information" transmitted by DCI is replaced with predetermined information and the user apparatus 10 performs a blind estimation of user (interference user) allocation situation in the interference signal.

In the interference user allocation information in the first embodiment, a number of interference users times of interference user ID, bandwidth (number of RBs) and start RB position information (also referred to as RB index) indicating the first RB position of PUSCH are included. On the other hand, in the interference allocation information in the second modified example, as shown in FIG. 15, a number of interference users times of interference user ID and information including one bit indicating whether the bandwidth (number of RBs) is, for example, equal to or more than three RBs or not as the predetermined information is included. It should be noted that the reason why the criteria of the bandwidth (number of RBs) is whether it is, for example, equal to or more than three is that the configuration of DMRS sequences becomes different depending on whether the bandwidth is equal to or more than 3 RBs. However, the criteria of the bandwidth is not limited to 3 RBs, but any value may be used for the criteria.

Figure 16:
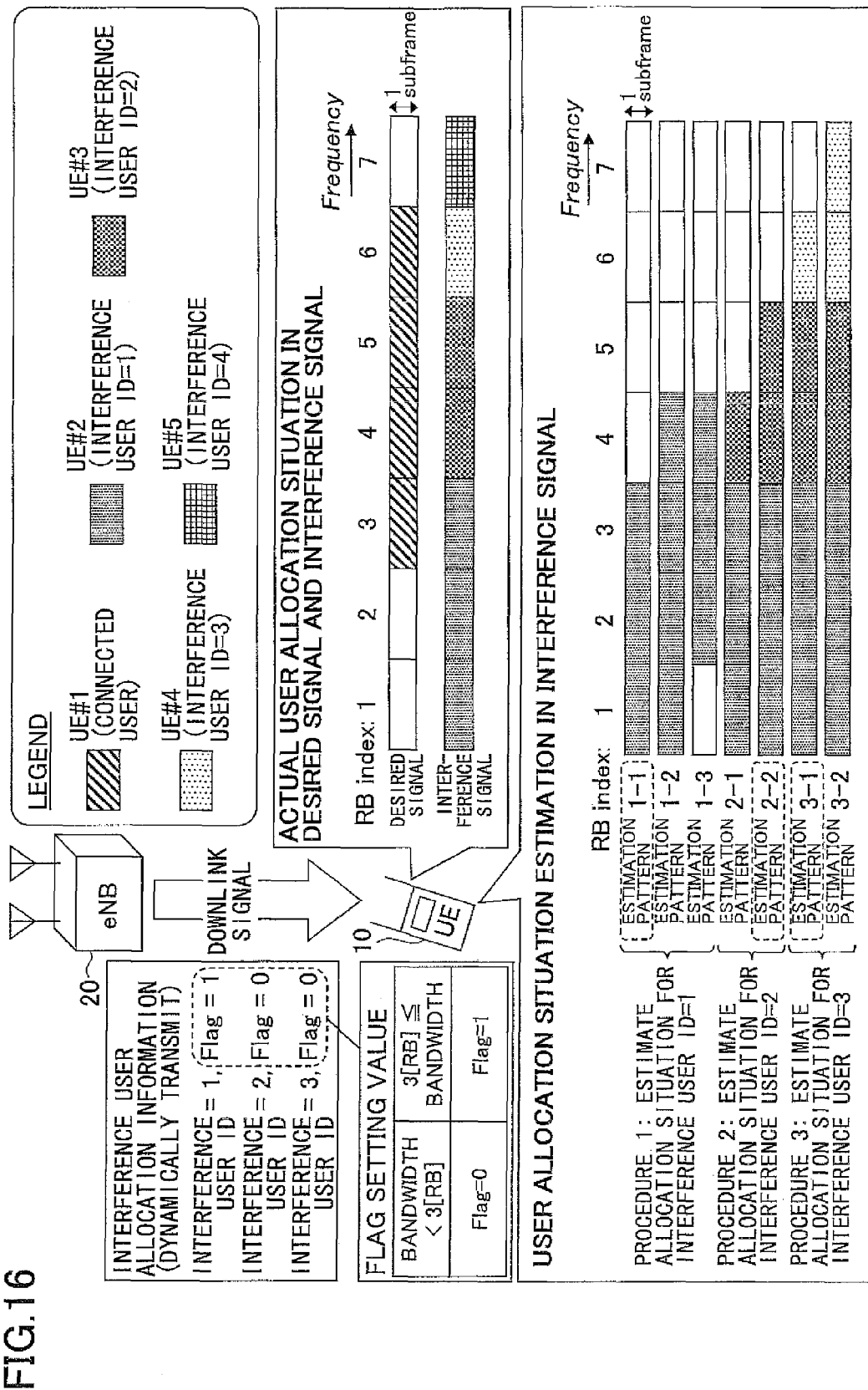
FIG. 16 is a drawing illustrating an estimation method of user allocation situation of interference signals in the second modified example.

Here, based on FIG. 16, an example of estimation method of user allocation situation of the interference signal in the second modified example will be described. As shown in FIG. 16, from the connected base station 20 to the user apparatus 10, as the interference user allocation information, an interference user ID and a flag indicating whether the bandwidth is equal to or more than three RBs are dynamically transmitted. Further, in the interference user allocation information, by using the method shown in FIG. 12, only user allocation information for users (UE#2 (interference user ID=1), UE#3 (interference user ID=2), UE#4 (interference user ID=3)) corresponding to the part allocated to the desired signal is included. In an example of FIG. 16, specifically, from the connected base station 20 to the user apparatus 10, interference user allocation information including, for example, interference user ID=1, Flag=1 (3 RBs=<the bandwidth), interference user ID=2, Flag=0 (the bandwidth<3 RBs), interference user ID=3, Flag=0 (the bandwidth<3 RBs), is dynamically transmitted by DCI.

The user apparatus 10 to which the interference user allocation information is transmitted performs, according to the following procedure, blind estimation of user allocation situation, more specifically, estimation of the bandwidth and the start RB position in the interference signal. It should be noted that as shown in FIG. 16, the desired signal RB indices "3" through "6" are allocated to the connected user (UE#1).

(Procedure 1): First, because the Flag of the interference user ID=1 included in the transmitted user allocation information is "1 (3 RBs=<the bandwidth)", the patterns for the user allocation situation of the interference user ID=1 can be estimated to be one of three estimated patterns 1-1 through 1-3. Here, interference noise power for each RB is measured and by assuming that an RB with relatively low interference noise power is not allocated to an interference user, blind estimation area is reduced. In this way, based on interference noise power of each RB, an identified pattern is determined as an estimated pattern. Here, for example, the estimated pattern 1-1 is determined as the estimated pattern of the interference user ID=1.

(Procedure 2): Next, a user allocation situation of the interference user ID=2 is estimated. Because the Flag of the interference user ID=2 is "0 (the bandwidth<3 RBs)", the estimated patterns include two patterns: estimated patterns 2-1, 2-2. Here, the same as the case of procedure 1, based on interference noise power of each RB, the estimated pattern 2-1, for example, is determined as the estimated pattern of the interference user ID=2.

(Procedure 3): Next, a user allocation situation of the interference user ID=3 is estimated. Because the Flag of the interference user ID=3 is "0 (the bandwidth<3 RBs)", the estimated patterns include two patterns: estimated patterns 3-1, 3-2. Here, the same as the case of procedure 1, based on interference noise power of each RB, the estimated pattern 3-1, for example, is determined as the estimated pattern of the interference user ID=3.

With the procedures described above, even in the case where the connected base station 20 reduces information included in the interference user allocation information to transmit, the user apparatus 10 can estimate user allocation situations in the interference signal by blind estimation.

It should be noted that the second modified example may be performed together with the first modified example.

In the following, a functional configuration and operation procedures of the radio communication system in the first embodiment of the present invention (including the first modified example and the second modified example) will be described.

[Functional Configuration]

<Base Station>

Figure 17:
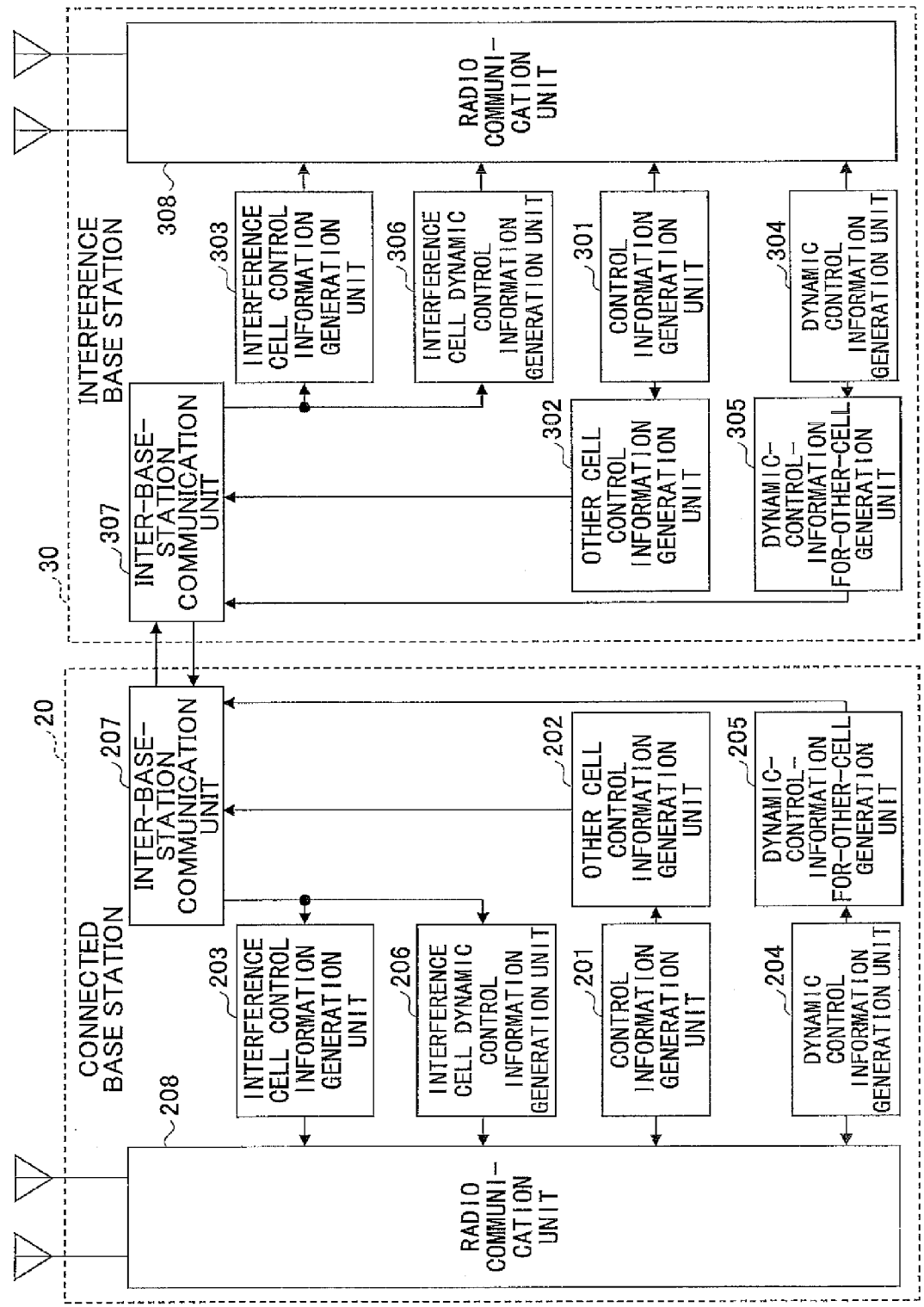
FIG. 17 is a drawing illustrating a functional configuration of a base station in the first embodiment of the present invention.

FIG. 17 is a drawing illustrating a functional configuration of a base station in the first embodiment of the present invention. In FIG. 17, the connected base station 20 and the interference base station 30 are shown.

As shown in FIG. 17, the connected base station 20 includes a control information generation unit 201, a control-information-for-other-cell generation unit 202, an interference cell control information generation unit 203, a dynamic control information generation unit 204, a dynamic-control-information-for-other-cell generation unit 205, an interference cell dynamic control information generation unit 206, an inter-base-station communication unit 207 and a radio communication unit 208.

The control information generation unit 201 generates semi-static control information of the connected cell shown in FIG. 9.

The control-information-for-other-cell generation unit 202 generates semi-static control information for other cells to be transmitted to the other cells (base stations).

The interference cell control information generation unit 203, based on the semi-static control information transmitted by the interference base stations 30, generates semi-static control information of the interference cells to be transmitted to the user apparatus 10 by using the downlink control signal. Here, the semi-static control information of the interference cells is semi-static control information shown in FIG. 11, FIG. 13, or FIG. 14.

The dynamic control information generation unit 204 generates dynamic control information of the connected cell shown in FIG. 9.

The dynamic-control-information-for-other-cell generation unit 205 generates dynamic control information for other cells to be transmitted to the other cells (base stations).

The interference cell dynamic control information generation unit 206, based on the dynamic control information transmitted from the interference base stations 30, generates dynamic control information of the interference cells to be transmitted to the user apparatus 10 by using the downlink control signal. Here, the dynamic control information of the interference cells is the dynamic control information shown in FIG. 11, FIG. 13 or FIG. 14. It should be noted that the interference cell dynamic control information generation unit 206 performs processes of removing information elements, reducing information included in the information element, and replacing the information included in the information element with a predetermined information in the first modified example and the second modified example of the first embodiment.

The inter-base-station communication unit 207 transmits/receives various kinds of information to/from other base stations. It should be noted that the communication performed by the inter-base-station communication unit 207 can be either radio communication or wired communication.

The radio communication unit 208 performs signal processing and transmits/receives signals to/from the user apparatus 10 through radio communications.

It should be noted that the interference base station 30 includes the similar functional configuration as the connected base station 20. A control information generation unit 301, a control-information-for-other-cell generation unit 302, an interference cell control information generation unit 303, a dynamic control information generation unit 304, a dynamic-control-information-for-other-cell generation unit 305, an interference cell dynamic control information generation unit 306, an inter-base-station communication unit 307 and a radio communication unit 308 included in the interference base station 30 correspond to the control information generation unit 201, the control-information-for-other-cell generation unit 202, the interference cell control information generation unit 203, the dynamic control information generation unit 204, the dynamic-control-information-for-other-cell generation unit 205, the interference cell dynamic control information generation unit 206, the inter-base-station communication unit 207 and the radio communication unit 208 included in the connected base station 20, respectively.

<User Apparatus>

Figure 18:
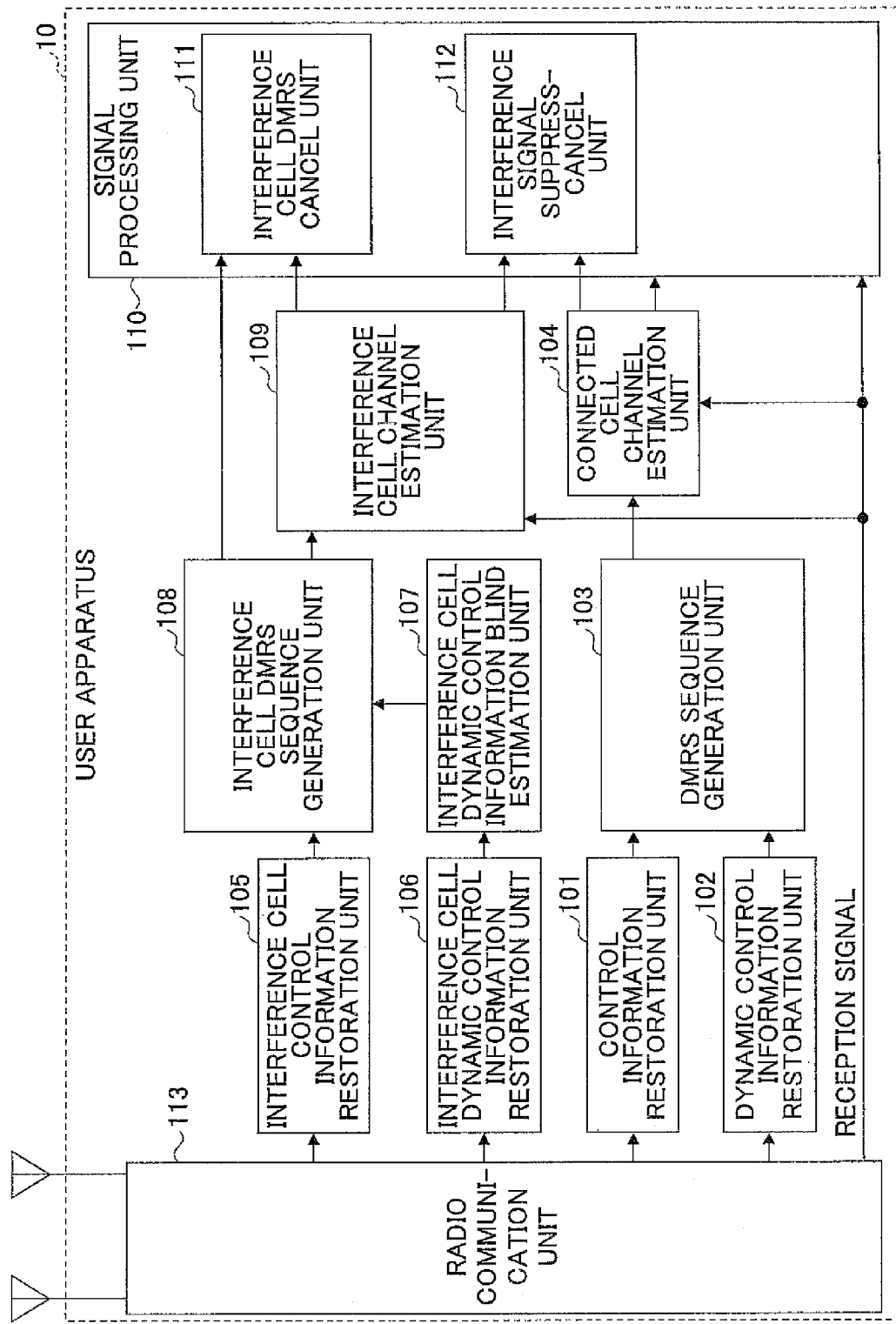
FIG. 18 is a drawing illustrating a functional configuration of a user apparatus in the first embodiment of the present invention.

FIG. 18 is a drawing illustrating a functional configuration of the user apparatus 10 in the first embodiment of the present invention.

As shown in FIG. 18, the user apparatus 10 includes a control information restoration unit 101, a dynamic control information restoration unit 102, a DMRS sequence generation unit 103, a connected cell channel estimation unit 104, an interference cell control information restoration unit 105, an interference cell dynamic control information restoration unit 106, an interference cell dynamic control information blind estimation unit 107, an interference cell DMRS sequence generation unit 108, an interference cell channel estimation unit 109, a signal processing unit 110 and a radio communication unit 113. In the signal processing unit 110, an interference cell DMRS cancel unit 111 and an interference signal suppression-cancel unit 112 are included. It should be noted that the DMRS sequence generation unit 103, the connected cell channel estimation unit 104, the interference cell dynamic control information blind estimation unit 107, the interference cell DMRS sequence generation unit 108, the interference cell channel estimation unit 109, the signal processing unit 110, and the interference cell DMRS cancel unit 111 and the interference signal suppression-cancel unit 112 included in the signal processing unit 110, are examples of interference reduction means.

The control information restoration unit 101 restores the semi-static control information of the connected cell transmitted by the connected base station 20.

The dynamic control information restoration unit 102 restores the dynamic control information of the connected cell transmitted by the connected base station 20.

The DMRS sequence generation unit 103, based on the semi-dynamic control information of the connected cell restored by the control information restoration unit 101 and the dynamic control information of the connected cell restored by the dynamic control information restoration unit 102, generates DMRS sequence of the connected cell.

The connected cell channel estimation unit 104, based on the generated DMRS sequence of the connected cell and the received signals, estimates the channel of the PUSCH area of the desired signal.

The interference cell control information restoration unit 105 restores the semi-static control information of the interference cell transmitted from the connected base station 20.

The interference cell dynamic control information restoration unit 106 restores the dynamic control information of the interference cell transmitted from the connected base station 20.

The interference cell dynamic control information blind estimation unit 107 performs blind estimation of missing information (removed by the connected base station 20) in the dynamic control information transmitted from the connected base station 20. It should be noted that the interference cell dynamic control information blind estimation unit 107 is necessary in a case where, as in the first modified example and the second modified example of the first embodiment, a process is performed for estimating missing information necessary for generating the DMRS sequence of the interference cell, and is not necessary in a case where the process is not performed.

The interference cell DMRS sequence generation unit 108, based on the semi-static control information of the interference cell restored by the interference cell control information restoration unit 105 and the dynamic control information restored by the interference cell dynamic control information restoration unit 106, generates the DMRS sequence of the interference cell.

The interference cell channel estimation unit 109, based on the DMRS sequence of the interference cell generated by the interference cell DMRS sequence generation unit 108 and the received signal, performs channel estimation of the PUSCH area of the interference signal.

The signal processing unit 110 performs demodulation and decoding processes of the desired signal. Specifically, the signal processing unit 110, based on the channel estimation result for the desired signal estimated by the connected cell channel estimation unit 104, demodulates the control information of the desired signal and the control information of the interference signal from the received signal.

The interference cell DMRS cancel unit 111, by using the channel estimation result of the interference signal estimated by the interference cell channel estimation unit 109 and the DMRS sequence of the interference cell generated by the interference cell DMRS sequence generation unit 108, cancels DMRS of the interference cell.

The interference signal suppression-cancel unit 112, based on the channel estimation result of the desired signal estimated by the connected cell channel estimation unit 104 and the channel estimation result of the interference cell estimated by the interference cell channel estimation unit 109, suppresses or cancels the interference signal of PUSCH. Specifically, in the case of suppressing the interference signal of PUSCH, the interference signal suppression-cancel unit 112 performs IRC reception by using the channel estimation results of the desired signal and the interference signal. Further, in the case of cancelling the interference signal of PUSCH, the interference signal suppression-cancel unit 112 performs blind estimation of the modulated signal of the interference signal and performs SIC process by using the channel estimation result of the desired signal and the interference signal.

The radio communication unit 113 performs a signal processing and transmits/receives signals to/from the base station through radio communications.

[Operation Procedures]

Figure 19:
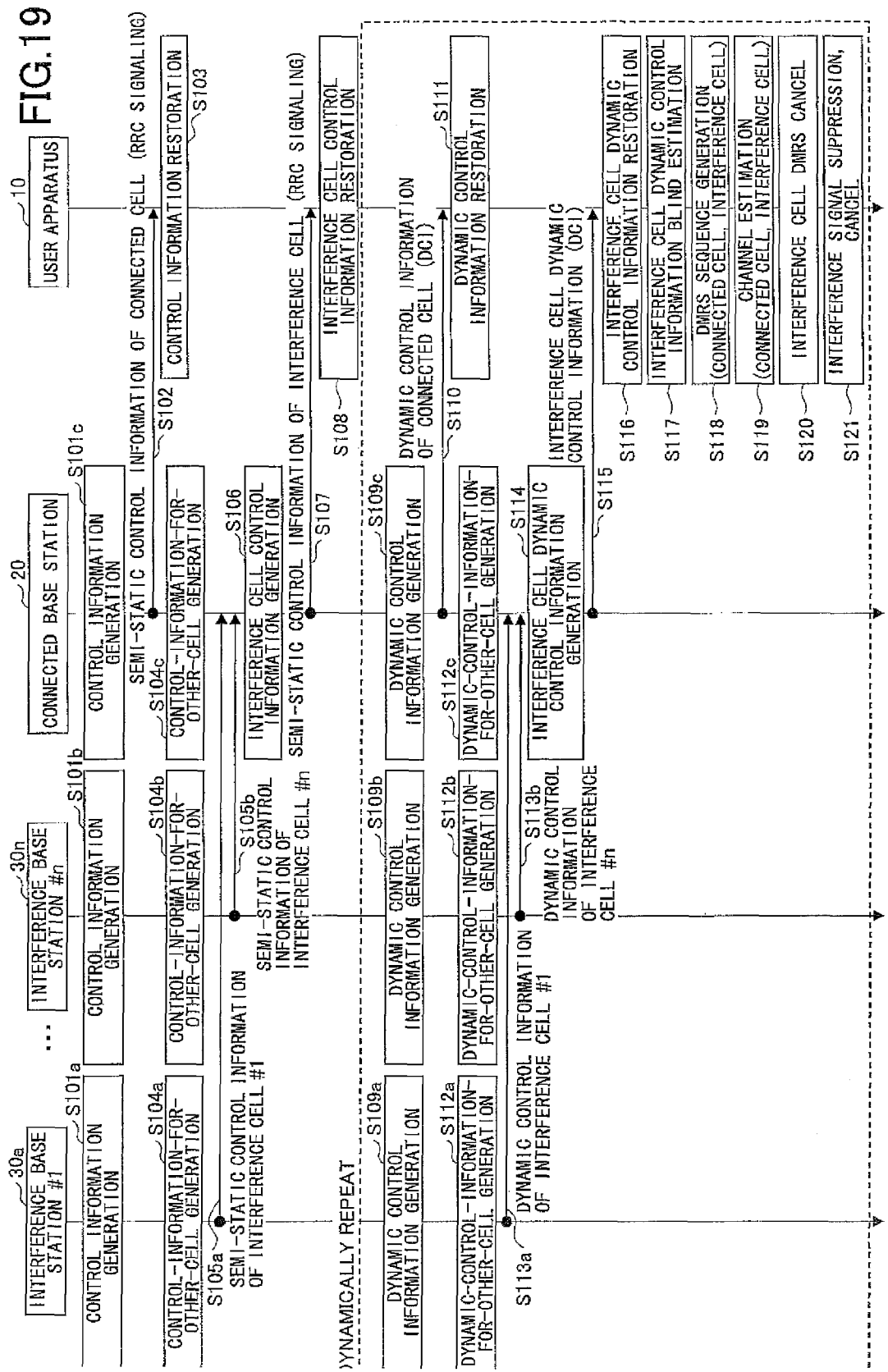
FIG. 19 is a sequence diagram illustrating an operation procedure of the radio communication system in the first embodiment of the present invention.

Next, based on FIG. 19, operations of the radio communication system including the functional configuration shown in FIG. 17 and FIG. 18 will be described. FIG. 19 is a sequence diagram illustrating an operation procedure of the radio communication system according to the first embodiment of the present invention. In an example of FIG. 19, an operation procedure is shown in which the user apparatus 10 which receives the desired signal from the connected base station 10 reduces the interference signals from the interference cells #1, . . . , #n of the interference base stations #1 (interference base station 30a), . . . , #n (interference base station 30n). It should be noted that, in the following description, the interference base stations 30 include two interference base stations 30a and 30n, but the interference base stations 30 may include any number of interference base stations.

In steps S101a and S101b, the control information generation units 301 of the interference base stations 30a and 30n generate the semi-static information of the interference cells #1 and #n of the interference base stations 30a and 30n, respectively.

In step S101c, the control information generation unit 201 of the connected base station 20 generates the semi-static control information of the connected cell.

In step S102, the radio communication unit 208 of the connected base station 20 transmits the generated semi-static control information of the connected cell to the user apparatus 10 by using a higher layer signaling (for example, RRC signaling).

In step S103, upon receiving the semi-static control information of the connected cell from the connected base station 20 via the radio communication unit 113, the control information restoration unit 101 of the user apparatus 10 restores the received semi-static control information of the connected cell.

In steps S104a and S104b, the control-information-for-other-cell generation units 302 of the interference base stations 30a and 30n, based on the semi-static control information of the interference cells #1 and #2 generated in steps S101a and S101b, generate the semi-static control information for other cells to be transmitted to the other cells (connected base station 20).

In step S104c, the control-information-for-other-cell generation unit 202 of the connected base station 20 also, similar to steps S104a and S104b, based on the semi-static control information of the connected cell generated in step S101c, generates the semi-static control information for other cells to be transmitted to the other cells.

In steps S105a and S105b, the inter-base-station communication units 307 of the interference base stations 30a and 30n transmit the generated semi-static control information of the interference cells #1 and #n for other cells to the connected base station 20, respectively.

It should be noted that, in an example of FIG. 19, a process is omitted in which the connected base station 20 transmits the semi-static control information for other cells to other base stations.

In step S106, upon receiving the semi-static control information of the interference cells #1 and #0 via the inter-base-station communication unit 207, the interference cell control information generation unit 203, based on the received semi-static control information of other cells (interference cells #1 and #n), generates semi-static control information of the interference cells (interference cells #1 and #n) to be transmitted to the user apparatus 10.

In step S107, the radio communication unit 208 of the connected base station 20 transmits the generated semi-static control information of the interference cells to the user apparatus 10 by using RRC signaling.

In step S108, upon receiving the semi-static control information of the interference cells from the connected base station 20, the interference cell control information restoration unit 105 of the user apparatus 10 restores the received semi-static control information of the interference cells.

The following processes of steps S109 through S121 are dynamically performed repeatedly (for example, 1 subframe (1 ms) period). It should be noted that regarding the "dynamically performed", it is not limited to the above 1 subframe period, but it may be performed repeatedly at, for example, 0 to 5 ms intervals.

In steps S109a and S109b, the dynamic control information generation units 304 of the interference base stations 30a and 30n generate the dynamic control information of the interference cells #1 and #n of the interference base stations 30a and 30n, respectively.

In step S109c, the dynamic control information generation unit 204 of the connected base station 20 generates the dynamic control information of the connected cell.

In step S110, the radio communication unit 208 of the connected base station 20, by using downlink control information (DCI), transmits the generated dynamic control information of the connected cell to the user apparatus 10. It should be noted that the dynamic control information is included in a DCI format. Multiple kinds of DCI formats are available and the dynamic control information is included in at least one kind of the DCI formats.

In step S111, upon receiving the dynamic control information of the connected cell from the connected base station 20 via the radio communication unit 113, the dynamic control information restoration unit 102 of the user apparatus 10 restores the received dynamic control information of the connected cell.

In steps 112a and 112b, the dynamic-control-information-for-other-cell generation units 305 of the interference base stations 30a and 30n, based on the dynamic control information of the interference cells #1 and #n generated in steps S109a and S109b, generate the dynamic control information for other cells to be transmitted to the other cells (the connected base station 20).

In step S112c, the dynamic-control-information-for-other-cell generation unit 205 of the connected base station 20 also, similar to steps S112a and S112b, based on the dynamic control information generated in step S109c, generates the dynamic control information for other cells to be transmitted to the other cells.

In steps S113a and S113b, the inter-base-station communication units 307 of the interference base stations 30a and 30n transmit the generated dynamic control information of the interference cells #1 and #n for other cells to the connected base station 20.

It should be noted that, in an example of FIG. 19, a process is omitted in which the connected base station 20 transmits the dynamic control information for other cells to other base stations.

In step S114, upon receiving the dynamic control information of the interference cells #1 and #n via the inter-base-station communication unit 207, the interference cell dynamic control information generation unit 206 of the connected base station 20, based on the received dynamic control information of the other cells (interference cells #1 and #n), generates the dynamic control information of the interference cells (interference cells #1 and #n) to be transmitted to the user apparatus 10.

In step S115, the radio communication unit 208 of the connected base station 20 transmits the generated dynamic control information of the interference cells to the user apparatus 10 by DCI.

In step S116, upon receiving the dynamic control information of the interference cells from the connected base station 20 via the radio communication unit 113, the interference cell dynamic control information restoration unit 106 of the user apparatus 10 restores the received dynamic control information of the interference cells.

In step S117, the interference cell dynamic control information blind estimation unit 107 performs blind estimation of missing information in the restored dynamic control information of the interference cells transmitted from the connected base station 20. It should be noted that the process of step S117 is not necessary in the case where it is not assumed that there is missing information necessary for generating the DMRS sequences of the interference cells as in the first modified example and the second modified example of the first embodiment.

In step S118, the DMRS sequence generation unit 103, based on the semi-static control information of the connected cell restored in step S103 and the dynamic control information of the connected cell restored in step S111, generates the DMRS sequence of the connected cell. Further, the interference cell DMRS sequence generation unit 108, based on the semi-static control information of the interference cells restored in step S108 and the dynamic control information of the interference cells restored in step S116, generates the DMRS sequences of the interference cells.

In step S119, the connected cell channel estimation unit 104, based on the generated DMRS sequence of the connected cell and the received signal, estimates the channel of the desired signal. Further, the interference cell channel estimation unit 109, based on the generated DMRS sequences of the interference cells and the received signal, estimates the channel of the interference signals.

In step S120, the interference cell DMRS cancel unit 111, by using the DMRS sequences of the interference cells generated in step S118 and the results of channel estimation of the interference signals estimated in step S119, cancels DMRS of the interference cells.

In step S121, the interference signal suppression-cancel unit 112, based on the channel estimation result of the connected cell and the interference signals estimated in step S119, suppresses or cancels the interference signals of PUSCH.

As described above, in the radio communication system of the first embodiment of the present invention, the connected base station 20, by using the downlink control signal to the user apparatus 10, transmits the control information (the semi-static control information and the dynamic control information) of the interference base stations 30 which is used for generation of the DMRS sequence and for channel estimation of the interference signals according to the DMRS. Further, the user apparatus 10, by using the control information transmitted from the connected base station 20, performs channel estimation of the interference signals of the PUSCH area according to the DMRS, and by using the results of channel estimation of the interference signals and the generated DMRS sequences of the interference cells, can cancel the DMRS of the interference cells. Further, the user apparatus 10, by using the above channel estimation result, can suppress or cancel the interference signals of the PUSCH area. In other words, the user apparatus 10 can reduce the uplink interference signals while receiving the desired downlink signal.

Second Embodiment

As described above, in the second embodiment of the present invention, the target signal of the interference reduction is SRS. It should be noted that it is possible that the second embodiment is performed together with the first embodiment (including the first modified example and the second modified example).

<Method of Interference Reduction>

The method of interference reduction of the target signal in the second embodiment is shown in FIG. 20. As shown in FIG. 20, the user apparatus 10, for the interference signal of SRS, performs channel estimation according to SRS and cancels the interference signal by using the SRS sequence.

<Control Information of the Connected Cell>

Control information which is transmitted from the connected base station 20 to the user apparatus 10, and is necessary for SRS sequence generation and channel estimation according to SRS is shown in FIG. 21.

As shown in FIG. 21, the control information necessary for SRS sequence generation and channel estimation is semi-static control information transmitted by RRC signaling as higher layer signaling. The semi-static control information further includes information elements which are transmitted by common parameters for all user apparatuses (UEs) in the cell and information elements which are transmitted by individual parameters for each user apparatus. Further, the control information transmitted by the connected base station 20 does not include information elements of groupHoppingEnabled, sequenceHoppingEnabled, groupAssignmentPUSCH and cyclicShift, and the user apparatus 10 uses the values transmitted for the DMRS sequence as shown in FIG. 9. It should be noted that these information elements may be included in the control information transmitted by the connected base station 20. Further, information elements of srs-Bandwidth, freqDomainPosition, srs-ConfigIndex, transmissionComb, cyclicShift, and srs-AntennaPort are transmitted from the connected base station 20 to the user apparatus 10 by SRS periodic transmission, or by SRS aperiodic transmission in an independent operation.

Figure 22:
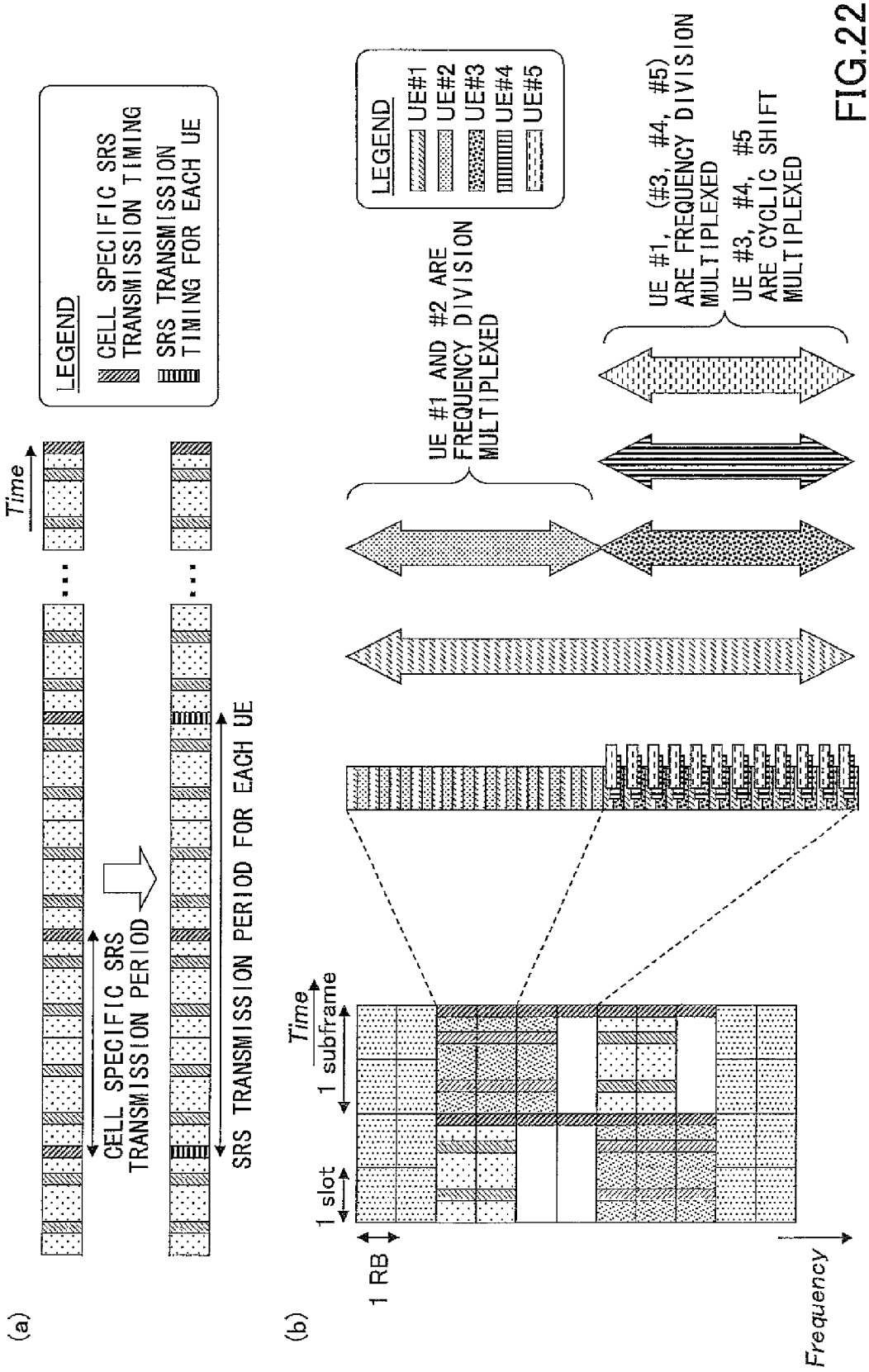
FIG. 22 is a drawing illustrating an SRS transmission interval and a user allocation image.

Further, an example of an SRS periodic transmission interval is shown in FIG. 22(*a*). As shown in FIG. 22(*a*), the SRS transmission interval includes intervals of a cell specific SRS transmission timing and an SRS transmission timing for each UE in the cell specific SRS transmission timing, and the SRS transmission is performed based on the SRS transmission interval for each UE. Further, an image of UE allocation in the SRS transmission is shown in FIG. 22(*b*).

<Control Information of the Interference Cell>

In the second embodiment, in order for interference cell SRS sequence generation and channel estimation according to the SRS to be performed, control information of the interference cells is transmitted from the connected base station 20 to the user apparatus 10. The connected base station 20, based on control information of the interference cells transmitted from the interference cells 30, generates the control information of the interference cells as shown in FIG. 23. As shown in FIG. 23, the control information of the interference cells is similar to the control information of the connected cell shown in FIG. 21, but there are differences in that the information elements transmitted commonly in the cell include as many as the number of the interference cells times the information elements, and in that the information elements transmitted individually to each UE include as many as the number of interference users times the information elements corresponding to each interference user ID. It should be noted that in the case where the second embodiment is applied together with the first embodiment (including the first modified example and the second modified example), the connected base station 20 removes information elements of groupHoppingEnabled, sequenceHoppingEnabled, groupAssignmentPUSCH and cyclicShift shown in FIG. 23 from the control information to be transmitted to the user apparatus 10. In this case, the user apparatus 10 uses the values of the groupHoppingEnabled, the sequenceHoppingEnabled, the groupAssignmentPUSCH and the cyclicShift included in the control information transmitted in the first embodiment (FIG. 11, FIG. 13, FIG. 14 and FIG. 15).

As described above, in the radio communication system of the second embodiment of the present invention, the user apparatus 10 cancels SRS as an interference signal by using the SRS sequence generated based on the control information of the interference cells shown in FIG. 23 and the channel estimation result according to the SRS.

[Functional Configuration]

<Base Station>

Figure 24:
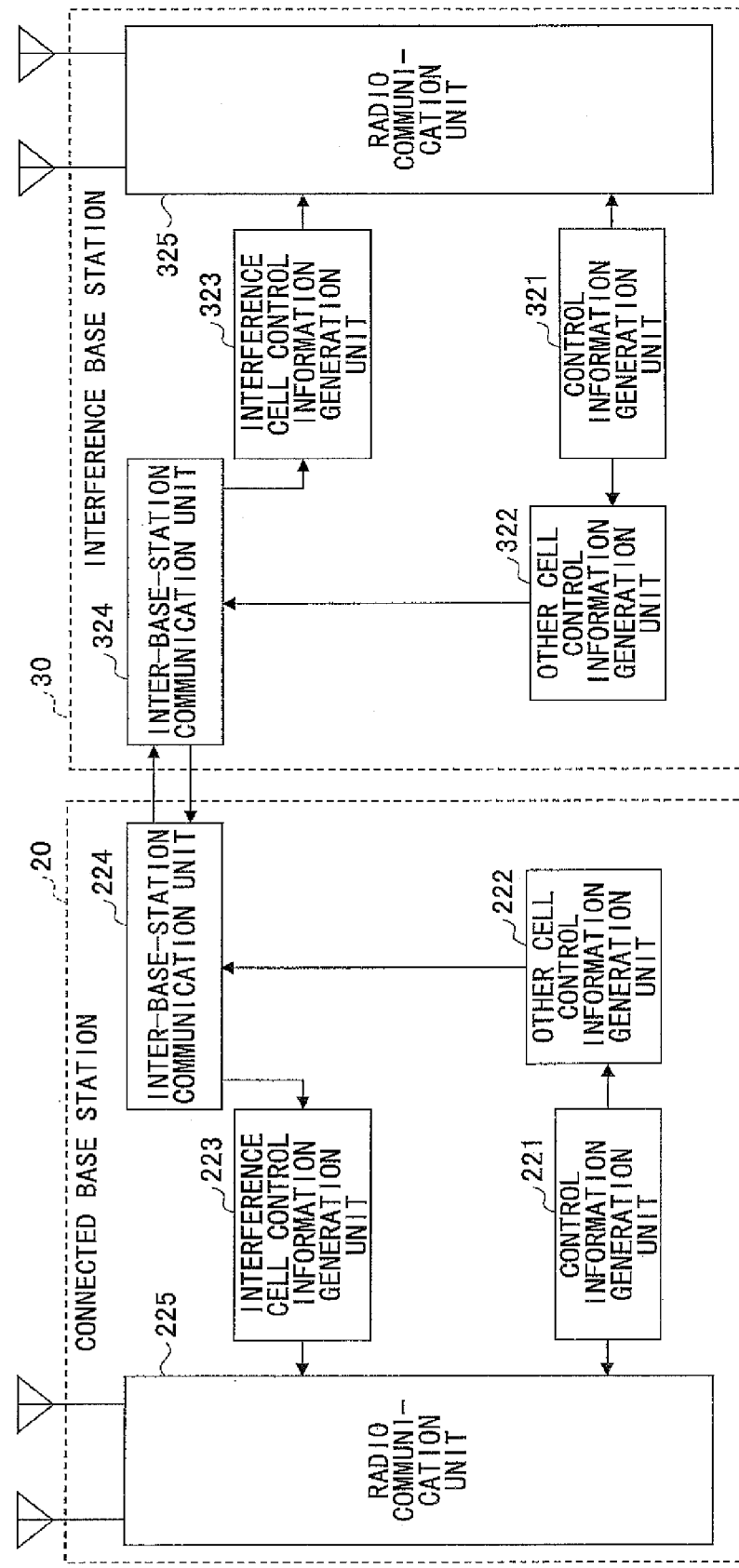
FIG. 24 is a drawing illustrating a functional configuration of the base station in the second embodiment of the present invention.

FIG. 24 is a drawing illustrating a functional configuration of the base station according to the second embodiment of the present invention. In FIG. 24, the connected base station 20 and the interference base station 30 are shown.

As shown in FIG. 24, the connected base station 20 includes a control information generation unit 221, a control-information-for-other-cell generation unit 222, an interference cell control information generation unit 223, an inter-base-station communication unit 224 and a radio communication unit 225.

The control information generation unit 221 generates the semi-static control information shown in FIG. 21.

The control-information-for-other-cell generation unit 222 generates the semi-static control information for other cells to be transmitted to the other cells (base stations).

The interference cell control information generation unit 223, based on the semi-static control information transmitted from the interference base station 30, generates the semi-static control information of the interference cell to be transmitted to the user apparatus 10 by using a downlink control signal. Here, the semi-static control information of the interference cell is the semi-static control information shown in FIG. 23.

The inter-base-station communication unit 224 transmits/receives control information, etc., to/from other base stations. It should be noted that the communication performed by the inter-base-station communication unit 224 may be either wired communication or wireless communication.

The radio communication unit 225 performs signal processing and transmits/receives signals to/from the user apparatus 10 via the radio communication.

It should be noted that the interference base station 30 includes a similar functional configuration as the connected base station 20. A control information generation unit 321, a control-information-for-other-cell generation unit 322, an interference cell control information generation unit 323, an inter-base-station communication unit 324 and a radio communication unit 325 included in the interference base station 30 correspond to the control information generation unit 221, the control-information-for-other-cell generation unit 222, the interference cell control information generation unit 223, the inter-base-station communication unit 224 and the radio communication unit 225 included in the connected base station 20, respectively.

<User Apparatus>

FIG. 25 is a drawing illustrating a functional configuration of the user apparatus 10 according to the second embodiment of the present invention.

As shown in FIG. 25, the user apparatus 10 includes a control information restoration unit 121, an SRS sequence generation unit 122, a connected cell channel estimation unit 123, an interference cell control information restoration unit 124, an interference cell SRS sequence generation unit 125, an interference cell channel estimation unit 126, a signal processing unit 127 and a radio communication unit 129. In the signal processing unit 127, an interference cell SRS cancel unit 128 is included. It should be noted that the SRS sequence generation unit 122, the connected cell channel estimation unit 123, the interference cell control information restoration unit 124, the interference cell SRS sequence generation unit 125, the interference cell channel estimation unit 126, the signal processing unit 127 and the interference cell SRS cancel unit 128 included in the signal processing unit 127 are an example of interference reduction means.

The control information restoration unit 121 restores the semi-static control information of the connected cell transmitted by the connected base station 20.

The SRS sequence generation unit 122, based on the semi-static control information of the connected cell restored by the control information restoration unit 121, generates the SRS sequence of the connected cell.

The connected cell channel estimation unit 123, based on the generated SRS sequence of the connected cell and the received signal, estimates the channel of the desired signal.

The interference cell control information restoration unit 124 restores the semi-static control information of interference cell transmitted by the connected base station 20.

The interference cell SRS sequence generation unit 125, based on the semi-static control information of the interference cell restored by the interference cell control information restoration unit 124, generates the SRS sequence of the interference cell.

The interference cell channel estimation unit 126, based on the SRS sequence of the interference cell generated by the interference cell SRS sequence generation unit 125 and the received signal, estimates the channel of the interference signal.

The signal processing unit 127 performs demodulation and decoding processing of the desired signal. Specifically, the signal processing unit 127, based on the result of the channel estimation for the desired signal estimated by the connected cell channel estimation unit 123, demodulates the control information of the desired signal and the interference signal from the received signal.

The interference cell SRS cancel unit 128, by using the result of channel estimation of the interference signal estimated by the interference cell channel estimation unit 126 and the SRS sequence of the interference cell generated by the interference cell SRS sequence generation unit 125, cancels SRS of the interference cell.

The radio communication unit 129 performs signal processing and transmits/receives signals to/from the base station via radio communications.

[Operation Procedure]

Next, referring to FIG. 26, an operation of the radio communication system including the functional configuration shown in FIG. 24 and FIG. 25 will be described. FIG. 26 is a sequence diagram illustrating an operation procedure of the radio communication system according to the second embodiment of the present invention. In an example of FIG. 26, an operation procedure is shown in which the user apparatus 10 which receives the desired signal from the connected base station 20 reduces interference signals from the interference cells #1, . . . , #n of the interference base stations #1 (interference base station 30a), . . . , #n (interference base station 30n). It should be noted that any number of interference base stations 30 may exist.

In steps S201a and S201b, the control information generation units 321 of the interference base stations 30a and 30n generate the semi-static control information of the interference cells #1 and #n of the interference base stations 30a and 30n, respectively.

In step S201c, the control information generation unit 221 of the connected base station 20 generates the semi-static control information of the connected cell.

In step S202, the radio communication unit 225 of the connected base station 20 transmits the generated semi-static control information of the connected cell to the user apparatus 10 by RRC signaling.

In step S203, upon receiving the semi-static control information of the connected cell from the connected base station 20, the control information restoration unit 121 of the user apparatus 10 restores the received semi-static control information of the connected cell.

In steps S204a and S204b, the control-information-for-other-cell generation units 322 of the interference base stations 30a and 30n, based on the semi-static control information of the interference cells #1 and #n generated in steps S201a and S201b, generate the semi-static control information for other cells to be transmitted to the other cells (connected base station 20).

In step S204c, similar to steps S204a and S204b, the control-information-for-other-cell generation unit 222 of the connected base station 20, based on the semi-static control information of the connected cell generated in step S201c, also generates the semi-static control information for other cells to be transmitted to the other cells.

In steps S205a and S205b, the inter-base-station communication units 324 of the interference base stations 30a and 30n transmit the generated semi-static control information of the interference cells #1 and #n for other cells to the connected base station 20.

It should be noted that, in an example of FIG. 26, a process is omitted in which the connected base station 20 transmits the semi-static control information for other cells to other base stations.

In step S206, upon receiving the semi-static control information of the interference cells #1 and #n via the inter-base-station communication unit 224, the interference cell control information generation unit 223 of the connected base station 20, based on the received semi-static control information of the other cells (interference cells #1 and #n), generates the semi-static control information of the interference cells (interference cells #1 and #n) to be transmitted to the user apparatus 10.

In step S207, the radio communication unit 225 of the connected base station 20 transmits the generated semi-static control information of interference cell to the user apparatus 10 by RRC signaling.

In step S208, upon receiving the semi-static control information of the interference cells from the connected base station 20 via the radio communication unit 129, the interference cell control information restoration unit 124 of the user apparatus 10 restores the received semi-static control information of the interference cells.

The following processes of steps S209 through S211 are dynamically performed repeatedly (for example, 1 subframe (1 ms) period). It should be noted that regarding the "dynamically performed", it is not limited to the above 1 subframe period, but it may be performed repeatedly at, for example, 0 to 5 ms intervals.

In step S209, the SRS sequence generation unit 122, based on the semi-static control information of connected cell restored in step S203, generates the SRS sequence of the connected cell. Further, the interference cell SRS sequence generation unit 125, based on the semi-static control information of the other cells restored in step S208, generates the SRS sequences of the interference cells.

In step S210, the connected cell channel estimation unit 123, based on the generated SRS sequence of the connected cell and the received signal, estimates the channel of the desired signal. Further, the interference cell channel estimation unit 126, based on the generated SRS sequences of the interference cells and the received signal, estimates the channels of the interference signals.

In step S211, the interference cell SRS cancel unit 128, by using the SRS sequences of the interference cells generated in step S209 and the result of channel estimation of the interference signals estimated in step S210, cancels the SRS of the interference cells.

As described above, in the radio communication system according to the second embodiment of the present invention, the connected base station 20 transmits the control information (semi-static control information) of the interference base stations 30 which is used for SRS sequence generation and channel estimation of the interference signals due to SRS to the user apparatus 10 via the downlink control signal. Further, the user apparatus 10, by using the control information transmitted by the connected base station 20, can perform channel estimation of the interference signals due to SRS, and using the results of channel estimation of the interference signals and generated SRS sequences of the interference cells, can cancel SRS of the interference cells. In other words, the user apparatus 10 can reduce the uplink interference signals.

As described above, by applying the first embodiment and the second embodiment of the present invention, it is possible to reduce the uplink interference signals which may be generated in a radio communication system in which, for example, a dynamic TDD or machine-to-machine communications are introduced and it is possible to realize the improved receive quality at the user apparatus and the improved throughput.

The embodiments of the present invention have been described above, but the disclosed invention is not limited to these embodiments, and a skilled person would understand various modified examples, replaced examples, etc. In order to facilitate understanding of the present invention, descriptions have been made by using specific numbers, which are merely example numbers and may be any number. Division of items in the above description is not essential for the present invention. Matters described in two or more items may be combined and used as necessary. A matter described in one item may be applied to another item (as long as it can be applied without contradiction). Borders of functional units or processing units in a functional configuration diagram may not necessarily correspond to borders of physical parts. Operations of multiple functional units may be performed physically by one part, or an operation of a functional unit may be performed physically by multiple parts. For convenience of description, the base station and the user apparatus are described by using functional configuration diagrams, but these apparatuses may be implemented as hardware, software (software executed by a processor included in the base station, or software executed by a processor included in the user apparatus), or a combination of hardware and software. Software to be operated according to the present embodiments may be stored in any appropriate medium such as a random access memory (RAM), a flash memory, a read only memory (ROM), an EPROM, an EEPROM, a register, a hard disk (HDD), a removable disk, a CD-ROM, a database, a server, etc. The present invention is not limited to the above embodiments, and various modified examples, replaced examples, etc., are included in the present invention.

The present application is based on and claims the benefit of priority of Japanese Priority Application No. 2013-150732 filed on Jul. 19, 2013, the entire contents of which are hereby incorporated by reference.

DESCRIPTION OF THE REFERENCE NUMERALS

10 User apparatus
101 Control information restoration unit
102 Dynamic control information restoration unit
103 DMRS sequence generation unit
104 Connected cell channel estimation unit
105 Interference cell control information restoration unit
106 Interference cell dynamic control information restoration unit
107 Interference cell dynamic control information blind estimation unit
108 Interference cell DMRS sequence generation unit
109 Interference cell channel estimation unit
110 Signal processing unit
111 Interference cell DMRS cancel unit
112 Interference signal suppression-cancel unit
113 Radio communication unit
121 Control information restoration unit
122 SRS sequence generation unit
123 Connected cell channel estimation unit
124 Interference cell control information restoration unit
125 Interference cell SRS sequence generation unit
126 Interference cell channel estimation unit
127 Signal processing unit
128 Interference cell SRS cancel unit
129 Radio communication unit
20 Connected base station
201 Control information generation unit
202 Control-information-for-other-cell generation unit
203 Interference cell control information generation unit
204 Dynamic control information generation unit
205 Dynamic-control-information-for-other-cell generation unit
206 Interference cell dynamic control information generation unit
207 Inter-base-station communication unit
208 Radio communication unit
221 Control information generation unit
222 Control-information-for-other-cell generation unit
223 Interference cell control information generation unit
224 Inter-base-station communication unit
225 Radio communication unit

The invention claimed is:

1. A base station connected to a user apparatus in a radio communication system, the base station comprising:
a receiving unit configured to receive from an interference base station first control information which is used by the user apparatus for reducing uplink interference signals from one or more cells formed by the interference base station or from another user apparatus by suppressing or canceling the interference signals;
a generation unit configured to generate second control information based on one or more pieces of the first control information received from the interference base station; and
a transmitting unit configured to transmit the second control information to the user apparatus by a downlink control signal,
wherein
the first control information is information used for channel estimation of a demodulation reference signal of physical uplink shared channel,
the downlink control signal is a higher layer signaling or downlink control information in a physical downlink control channel,
in the downlink control information, a predetermined information element based on a predetermined format is included, and
the generation unit, in a case where the second control information is transmitted as the downlink control information, generates the second control information in which the information elements in the downlink control information are partially removed or information included in the information element is partially removed.

2. The base station according to claim 1 wherein
the first control information is information used for channel estimation of a sounding reference signal, and
the downlink control signal is a higher layer signaling in a physical downlink control channel.

3. The base station according to claim 1 wherein
in the downlink control information, a predetermined information element based on a predetermined format is included, and
the generation unit, in a case where the second control information is transmitted as the downlink control information, generates the second control information in which information included in the information element in the downlink control information is partially replaced with predefined information.

4. The base station according to claim 1 wherein
the first control information is information used for channel estimation of a sounding reference signal, and
the downlink control signal is a higher layer signaling in a physical downlink control channel.

5. A base station connected to a user apparatus in a radio communication system, the base station comprising:
a receiving unit configured to receive from an interference base station first control information which is used by the user apparatus for reducing uplink interference signals from one or more cells formed by the interference base station or from another user apparatus by suppressing or canceling the interference signals;
a generation unit configured to generate second control information based on one or more pieces of the first control information received from the interference base station; and
a transmitting unit configured to transmit the second control information to the user apparatus by a downlink control signal,
wherein
the first control information is information used for channel estimation of a demodulation reference signal of physical uplink shared channel,
the downlink control signal is a higher layer signaling or downlink control information in a physical downlink control channel,
in the downlink control information, a predetermined information element based on a predetermined format is included, and
the generation unit, in a case where the second control information is transmitted as the downlink control information, generates the second control information in which information included in the information element in the downlink control information is partially replaced with predefined information.

6. The base station according to claim 5 wherein
the first control information is information used for channel estimation of a sounding reference signal, and
the downlink control signal is a higher layer signaling in a physical downlink control channel.

7. A user apparatus in a radio communication system including a plurality of base stations, the user apparatus comprising:
a receiving unit configured to receive control information, to be used for reducing an uplink interference signal from a cell formed by an interference base station of the user apparatus or from another user apparatus, transmitted from a connected base station by a downlink control signal; and
an interference reducing unit configured to, by using the control information, reduce the interference signal and obtain a desired signal from the connected base station by suppressing or canceling the interference signal,
wherein the interference reducing unit, in a case where the control signal is transmitted as downlink control information including a predefined information element based on a predetermined format in a physical downlink control channel from the connected base station, and where the information elements included in the downlink control information are partially removed, information included in the information element is partially removed, or information included in the information element is partially replaced with predetermined information, determines based on measured power of the interference signal a result of channel estimation from channels estimated based on the control information.

8. The user apparatus according to claim 7 wherein
the control information is information used by the user apparatus for channel estimation of a demodulation reference signal of a physical uplink shared channel, and
the interference reducing unit, by using a result of channel estimation of the demodulation reference signal based on the control information, performs demodulation reference signal cancellation and interference rejection combining reception or a successive interference cancellation of the physical uplink shared channel.

9. The user apparatus according to claim 8 wherein
the control information is information used by the user apparatus for channel estimation of a sounding reference signal, and the interference reducing unit, by using a result of the channel estimation of the sounding reference signal based on the control information, cancels the sounding reference signal.

10. The user apparatus according to claim 7 wherein
the control information is information used by the user apparatus for channel estimation of a sounding reference signal, and
the interference reducing unit, by using a result of the channel estimation of the sounding reference signal based on the control information, cancels the sounding reference signal.

11. The user apparatus according to claim 7 wherein
the control information is information used by the user apparatus for channel estimation of a sounding reference signal, and
the interference reducing unit, by using a result of the channel estimation of the sounding reference signal based on the control information, cancels the sounding reference signal.

12. A method of interference reduction for reducing an uplink interference signal from a cell formed by an interference base station of a user apparatus connected to a connected base station in a radio communication system, the method comprising:
  a first receiving step, by the connected base station, of receiving first control information of the interference base station which is used by the user apparatus for reducing the interference signal;
  a generating step, by the connected base station, of generating second control information based on one or more pieces of the first control information received from the interference base station;
  a transmitting step, by the connected base station, of transmitting the second control information to the user apparatus by a downlink control signal;
  a receiving step, by the user apparatus, of receiving the second control information transmitted from the connected base station; and
  an interference reducing step, by the user apparatus, of reducing the interference signal by using the second control information and obtaining the desired signal from the connected base station by suppressing or canceling the interference signal,
wherein
the first control information is information used for channel estimation of a demodulation reference signal of physical uplink shared channel,
the downlink control signal is a higher layer signaling or downlink control information in a physical downlink control channel,
in the downlink control information, a predetermined information element based on a predetermined format is included, and
the generation step, in a case where the second control information is transmitted as the downlink control information, generates the second control information in which the information elements in the downlink control information are partially removed or information included in the information element is partially removed.

* * * * *